(12) United States Patent
Jamali et al.

(10) Patent No.: US 11,852,827 B2
(45) Date of Patent: Dec. 26, 2023

(54) SWITCHABLE ARTIFICIAL REALITY DEVICE

(71) Applicant: Meta Platforms Technologies, LLC, Menlo Park, CA (US)

(72) Inventors: Afsoon Jamali, Issaquah, WA (US); Sandro Pintz, Menlo Park, CA (US); Kurt Jenkins, Sammamish, WA (US); Christopher Stipe, Woodinville, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/962,270

(22) Filed: Oct. 7, 2022

(65) Prior Publication Data

US 2023/0194873 A1    Jun. 22, 2023

Related U.S. Application Data

(60) Provisional application No. 63/291,923, filed on Dec. 20, 2021.

(51) Int. Cl.
*G02B 27/01*    (2006.01)
*G02F 1/1335*   (2006.01)
(Continued)

(52) U.S. Cl.
CPC ....... *G02B 27/0172* (2013.01); *G02F 1/0136* (2013.01); *G02F 1/133526* (2013.01);
(Continued)

(58) Field of Classification Search
CPC .............. G02B 27/017; G02B 27/0172; G02B 2027/0174; G02B 27/0176;
(Continued)

(56) References Cited

U.S. PATENT DOCUMENTS

| 10,303,030 B2 * | 5/2019 | Robinson ............ G02F 1/13306 |
| 10,598,933 B2 | 3/2020 | Ouderkirk |

(Continued)

FOREIGN PATENT DOCUMENTS

| JP | 2021131568 A | * | 9/2021 |
| KR | 20070046800 A | * | 5/2007 |

(Continued)

OTHER PUBLICATIONS

International Search Report and Written Opinion for International Application No. PCT/US2022/053431, dated Apr. 24, 2023, 9 pages.

*Primary Examiner* — Hoan C Nguyen
(74) *Attorney, Agent, or Firm* — MILLBURN IP PLLC

(57) ABSTRACT

A device is provided. The device includes a reflective polarizer configured to selectively reflect or transmit a polarized light based on a polarization of the polarized light. The device also includes a display element disposed at a first side of the reflective polarizer, and configured to output a first image light representing a virtual image. The device also includes a polarization switch disposed between the display element and the reflective polarizer, and configured to switch or maintain a polarization of the first image light. The device further includes an active dimming device disposed at a second side of the reflective polarizer, and configured to provide an adjustable transmittance of an input light.

20 Claims, 22 Drawing Sheets

(51) Int. Cl.
  *G02F 1/01* (2006.01)
  *G06F 1/16* (2006.01)
  *G02F 1/139* (2006.01)
  *G02F 1/1334* (2006.01)

(52) U.S. Cl.
  CPC ........ *G02F 1/133536* (2013.01); *G06F 1/163* (2013.01); *G02B 27/0176* (2013.01); *G02B 2027/0118* (2013.01); *G02B 2027/0161* (2013.01); *G02B 2027/0178* (2013.01); *G02F 1/1396* (2013.01); *G02F 1/13345* (2021.01)

(58) Field of Classification Search
  CPC ........ G02B 2027/0178; G02B 27/0955; G02B 27/0961; G02B 2027/0118; G02B 2027/0161; G02F 1/0136; G02F 1/0134; G02F 1/0126; G02F 1/133524; G02F 1/133536; G02F 1/133543; G02F 1/133548; G02F 1/133526; G02F 1/133528; G02F 1/133531; G02F 1/1336; G02F 1/133601; G02F 1/136; G02F 1/13345; G02F 1/13347; G02F 1/1335; G02F 1/1396; G02F 1/1397; G02F 1/1398

See application file for complete search history.

(56) References Cited

U.S. PATENT DOCUMENTS

| | | | |
|---|---|---|---|
| 10,989,926 B1 | 4/2021 | Matsuda et al. | |
| 2011/0188115 A1* | 8/2011 | Sharp | B29D 11/00644 |
| | | | 156/99 |
| 2015/0198810 A1 | 7/2015 | Lee et al. | |
| 2019/0331947 A1* | 10/2019 | Hagiwara | B32B 17/10458 |
| 2021/0223601 A1 | 7/2021 | Van Heugten et al. | |
| 2021/0339609 A1* | 11/2021 | Farreyrol | B60J 1/001 |

FOREIGN PATENT DOCUMENTS

| | | | | |
|---|---|---|---|---|
| KR | 20200095509 A | * | 8/2020 | |
| WO | WO-2017090289 A1 | * | 6/2017 | |
| WO | WO-2018150773 A1 | * | 8/2018 | ......... G02B 27/0172 |

* cited by examiner

SWITCHABLE ARTIFICIAL REALITY DEVICE

CROSS REFERENCE TO RELATED APPLICATION

This application claims the benefit of priority to U.S. Provisional Application No. 63/291,923, filed on Dec. 20, 2021. The content of the above-mentioned application is incorporated herein by reference in its entirety.

TECHNICAL FIELD

The present disclosure relates generally to optical devices and, more specifically, to a switchable artificial reality device.

BACKGROUND

An artificial reality device, such as a head-mounted display ("MID") or heads-up display ("HUD") device, have wide applications in various fields, including aviation, engineering design, medical surgery practice, and video gaming, etc. The artificial reality device may display virtual objects or combine images of real objects with virtual objects, as in augmented reality ("AR"), virtual reality ("VR"), and/or mixed reality ("MR") applications. When implemented for AR and/or MR applications, the artificial reality device may be at least partially transparent from the perspective of a user, enabling the user to view a surrounding real world environment. When implemented for VR application, the artificial reality device may be opaque such that the user is substantially immersed in the VR imagery provided via the artificial reality device.

SUMMARY OF THE DISCLOSURE

Consistent with an aspect of the present disclosure, a device is provided. The device includes a reflective polarizer configured to selectively reflect or transmit a polarized light based on a polarization of the polarized light. The device also includes a display element disposed at a first side of the reflective polarizer, and configured to output a first image light representing a virtual image. The device also includes a polarization switch disposed between the display element and the reflective polarizer, and configured to switch or maintain a polarization of the first image light. The device further includes an active dimming device disposed at a second side of the reflective polarizer, and configured to provide an adjustable transmittance of an input light.

Other aspects of the present disclosure can be understood by those skilled in the art in beam of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
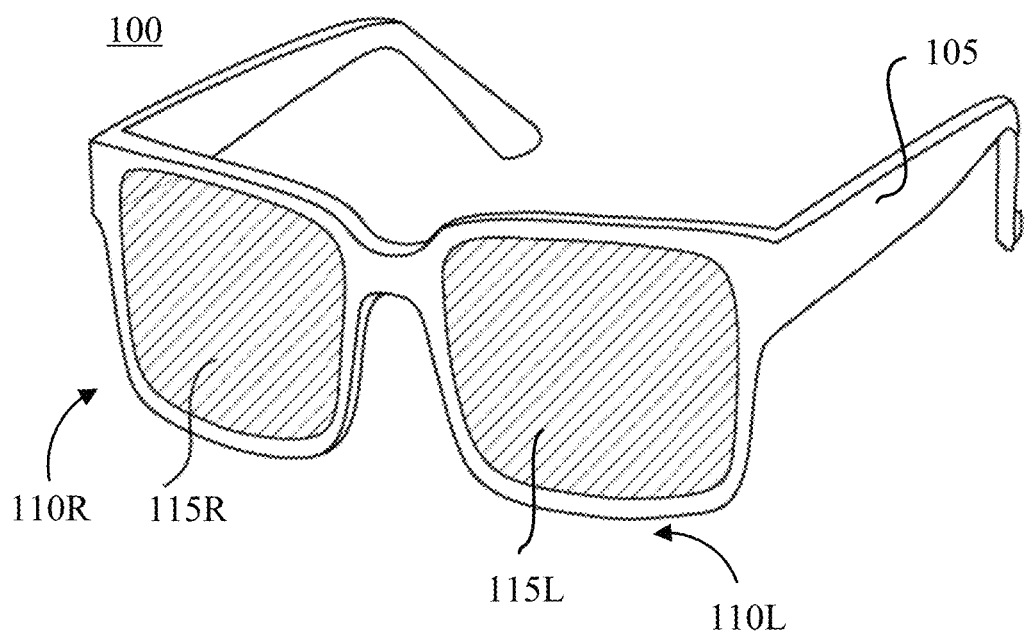
FIG. 1A illustrates a schematic diagram of an artificial reality device, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a beam output from one optical element may be directly or indirectly received by the other optical element. An optical series refers to optical positioning of a plurality of optical elements in a beam path, such that a beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or Be" For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory" computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane.

The term "orthogonal" as in "orthogonal polarizations" or the term "orthogonally" as in "orthogonally polarized" means that an inner product of two vectors representing the two polarizations is substantially zero. For example, two beams or beams with orthogonal polarizations (or two orthogonally polarized beams or beams) may be two linearly polarized beams (or beams) with two orthogonal polarization directions (e.g., an x-axis direction and a y-axis direction in a Cartesian coordinate system) or two circularly polarized beams with opposite handednesses (e.g., a left-handed circularly polarized beam and a right-handed circularly polarized beam).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a beam means that a major portion, including all, of a beam is transmitted, reflected, diffracted, or blocked, etc. The major portion may be a predetermined percentage (greater than 50%) of the entire beam, such as 100%, 98%, 90%, 85%, 80%, etc., which may be determined based on specific application needs.

The term "optic axis" may refer to a direction in a crystal. A beam propagating in the optic axis direction may not experience birefringence (or double refraction). An optic axis may be a direction rather than a single line: beams that are parallel to that direction may experience no birefringence.

The present disclosure provides an artificial reality device that is switchable between operating in an AR (or MR) mode and operating in a VR mode. FIG. 1A illustrates a schematic diagram of an artificial reality device 100 according to an embodiment of the present disclosure. FIG. 19 is a cross-sectional view of half of the artificial reality device 100 shown in FIG. 1A according to an embodiment of the present disclosure. For purposes of illustration, FIG. 19 shows the cross-sectional view associated with a left-eye display module 110L. The artificial reality device 100 may be implemented in HUDs, HMDs, NEDs, smart phones, laptops, televisions, vehicles, etc. In some embodiments, the artificial reality device 100 may be configured to be worn on a head of a user (e.g., by having the form of spectacles or eye glasses, as shown in FIG. 1A) or to be included as part of a helmet that is worn by the user. In some embodiments, the artificial reality device 100 may be configured for placement in proximity of an eye or eyes of the user at a fixed location in front of the eye(s), without being mounted to the head of the user. For example, the artificial reality device 100 may be mounted in a vehicle, such as a car or an airplane, at a location in front of an eye or eyes of the user.

For discussion purposes, FIG. 1A shows that the artificial reality device 100 includes a frame 105 configured to mount to a user's head. The frame 105 is merely an example structure to which various components of the artificial reality device 100 may be mounted. Other suitable type of fixtures may be used in place of or in combination with the frame 105. The artificial reality device 100 may include left-eye and right-eye display modules 110L and 110R mounted to the frame 105. The left-eye and right-eye display modules 110L and 110R may include image display components configured to project computer-generated virtual images into left and right display windows 115L and 115R in a field of view ("FOV"). The left-eye and right-eye display modules 110L and 110R may be any suitable display modules.

Figure 1B:
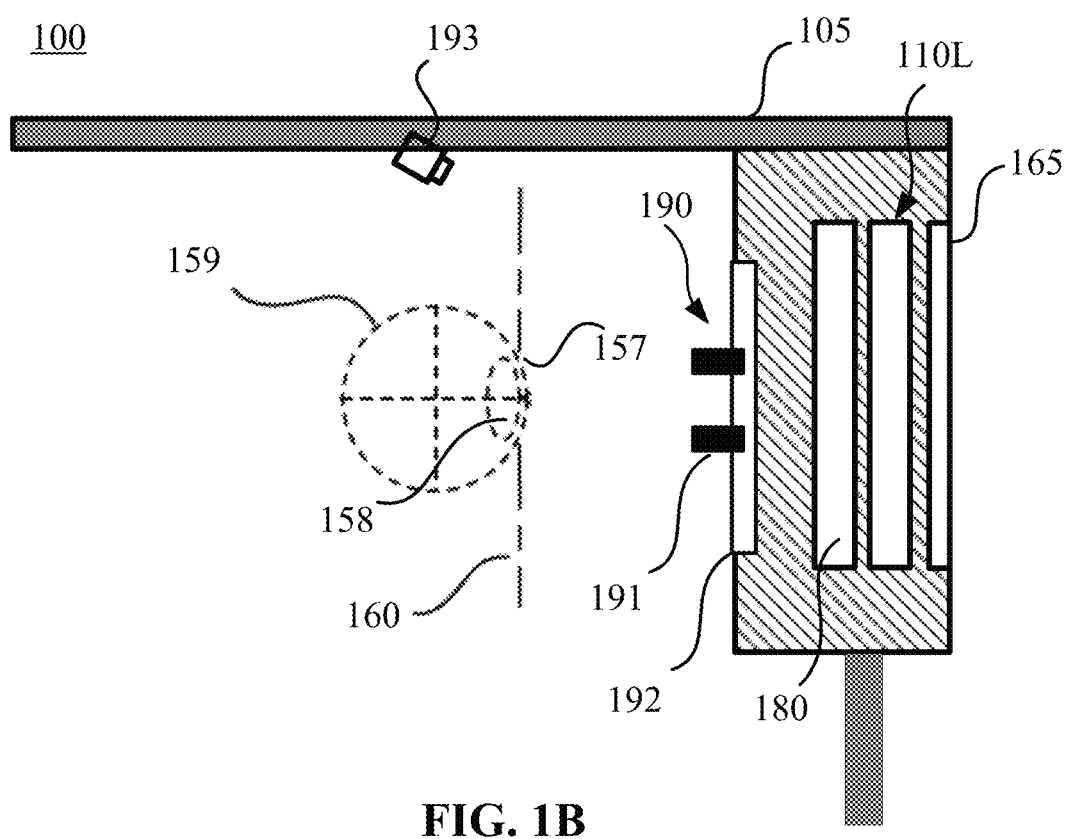
FIG. 1B schematically illustrates a cross-sectional view of half of the artificial reality device shown in FIG. 1A, according to an embodiment of the present disclosure.

In some embodiments, as shown in FIG. 1B, the left-eye display modules 110L may also include a viewing optics assembly 180 and an object tracking assembly 190 (e.g., eye tracking assembly and/or face tracking assembly). The viewing optics assembly 180 may be configured to guide the image light output from the left-eye display module 110L to one or more exit pupils 157 within an eye-box region 160. An exit pupil 157 may be a location where an eye pupil 158 of the eye 159 of the user may be positioned in the eye-box region 160 of the left-eye display module 110L. For example, the viewing optics assembly 180 may include one or more optical elements configured to perform a suitable optical adjustment of an image light output from the left-eye display modules 110L, e.g., correct aberrations in an image light output from the left-eye display modules 110L, focus the image light output from the left-eye display modules 110L to the one or more exit pupils 157, adjust a position of the focal point of the image light output from the left-eye display modules 110L in the eye-box region 160, etc.

The object tracking assembly 190 may include an infrared ("IR") light source 191 configured to emit an IR light to illuminate the eye 159 and/or the face, a deflecting element 192 (such as a grating), and an optical sensor 193 (such as a camera). The deflecting element 192 may deflect (e.g., diffract) the IR light reflected by the eye 159 toward the optical sensor 193. The optical sensor 193 may generate a tracking signal relating to the eye 159. The tracking signal may be an image of the eye 159. The artificial reality device 100 may include a controller (not shown), which may control various optical elements in the left-eye display modules 110L, the object tracking assembly 190, and/or the viewing optics assembly 180.

The artificial reality device 100 may be configured to operate in a VR mode, an AR mode, an MR mode, or any combination thereof. The artificial reality device 100 may be configured to be switchable among operating in the VR mode, the AR mode, and the MR mode, in both indoor and outdoor environments. In some embodiments, when the artificial reality device 100 operates in the AR or an MR mode, the left-eye and right-eye display systems 110L and 110R may be fully or partially transparent from the perspective of the user, which may provide the user with a view of a surrounding real-world environment. In some embodiments, when the artificial reality device 100 operates in the VR mode, the left-eye and right-eye display systems 110L and 110R may be opaque to block the light from the real-world environment, such that the user may be immersed in the VR imagery based on computer-generated images. In some embodiments, the artificial reality device 100 may include an adaptive or active dimming device 165 configured to dynamically adjust the transmittance of a light from a real world environment (referred to as a real world light), thereby switching the artificial reality device 100 between operating in the VR mode and operating in the AR mode, or between operating in the VR mode and operating in the MR mode. In some embodiments, along with switching between the AR mode and the VR mode, or between the MR mode and the VR mode, the active dimming device 165 may be configured to mitigate differences in intensities of a real world light and a virtual image light when the artificial reality device 100 operates in the AR or MR mode.

Figure 1C:
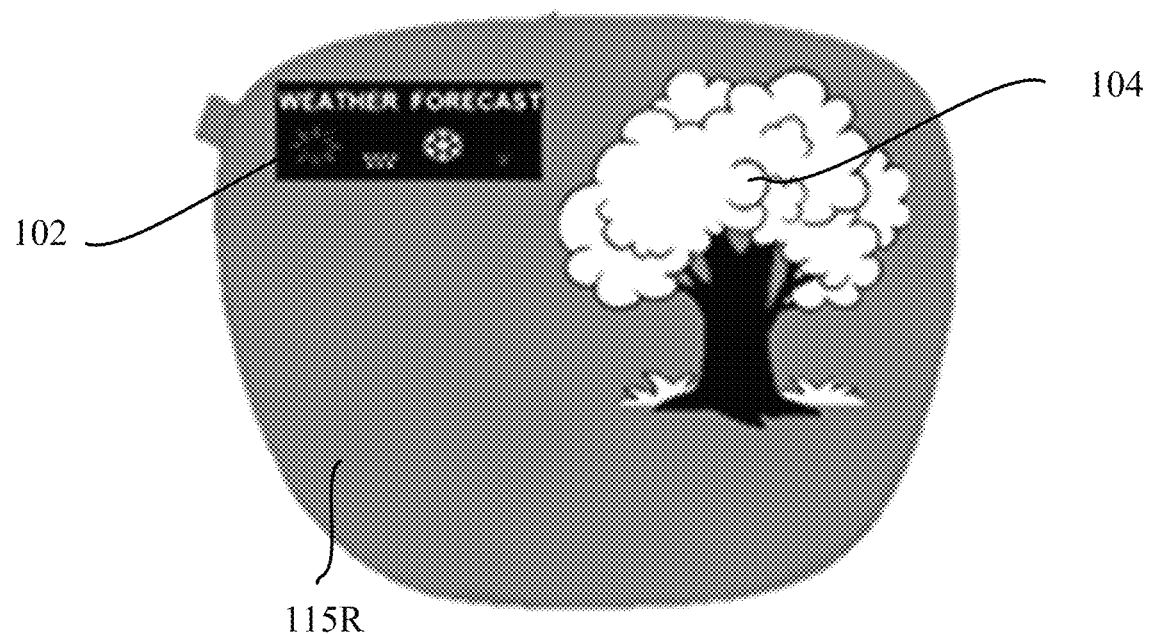
FIG. 1C illustrates an image perceived by a user of the artificial reality device when the artificial reality device shown in FIG. 1A operates in an augmented reality ("AR") or mixed reality ("MR") mode, according to an embodiment of the present disclosure.
Figure 1D:
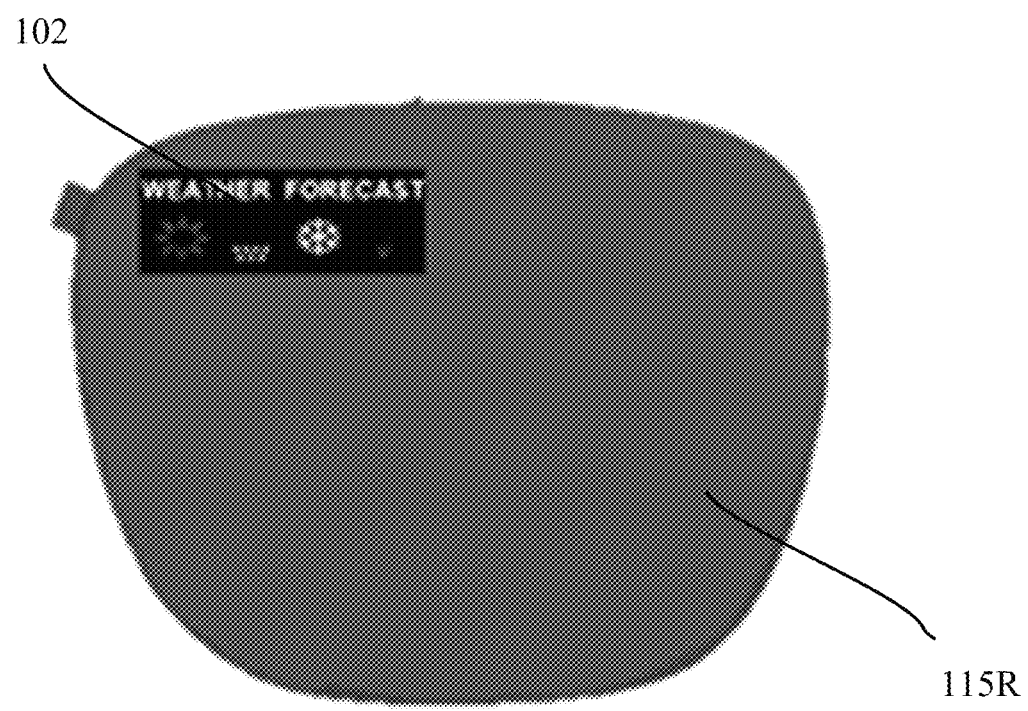
FIG. 1D illustrates an image perceived by a user of the artificial reality device when the artificial reality device shown in FIG. 1A operates in a virtual reality ("VR"), according to an embodiment of the present disclosure.

FIG. 1C illustrates an image perceived by a user of the artificial reality device 100 operating in the AR or MR mode, according to an embodiment of the present disclosure. FIG. 1D illustrates an image perceived by a user of the artificial reality device 100 operating in the VR mode, according to an embodiment of the present disclosure. For discussion purposes, FIGS. 1C and 1D show the images viewed through the right display window 115R. As shown in FIG. 1C, when the artificial reality device 100 operates in the AR or MR mode, the user may perceive a virtual scene 102 superimposed with a real-world scene 104 when the user looks at the right display window 115R. As shown in FIG. M, when the artificial reality device 100 operates in the VR mode, the user may only perceive the virtual scene 102 when the user looks at the right display window 115R.

In the following, exemplary artificial reality devices configured to be switchable between operating in the VR mode and operating in the AR mode, or between operating in the VR mode and operating in the MR mode, will be explained.

Figure 2A:
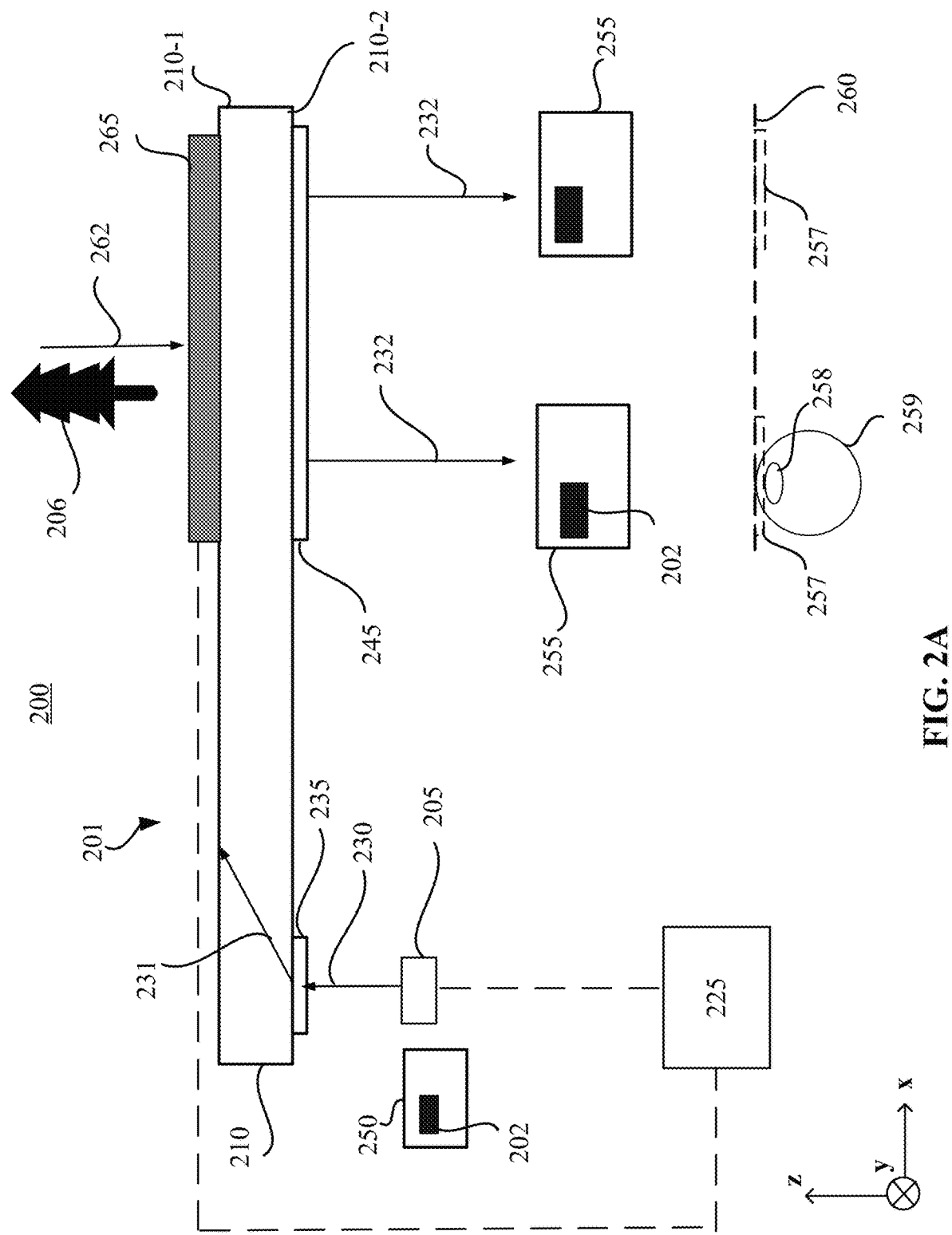
FIGS. 2A and 2B illustrate schematic diagrams of an artificial reality device, according to an embodiment of the present disclosure.
Figure 2B:
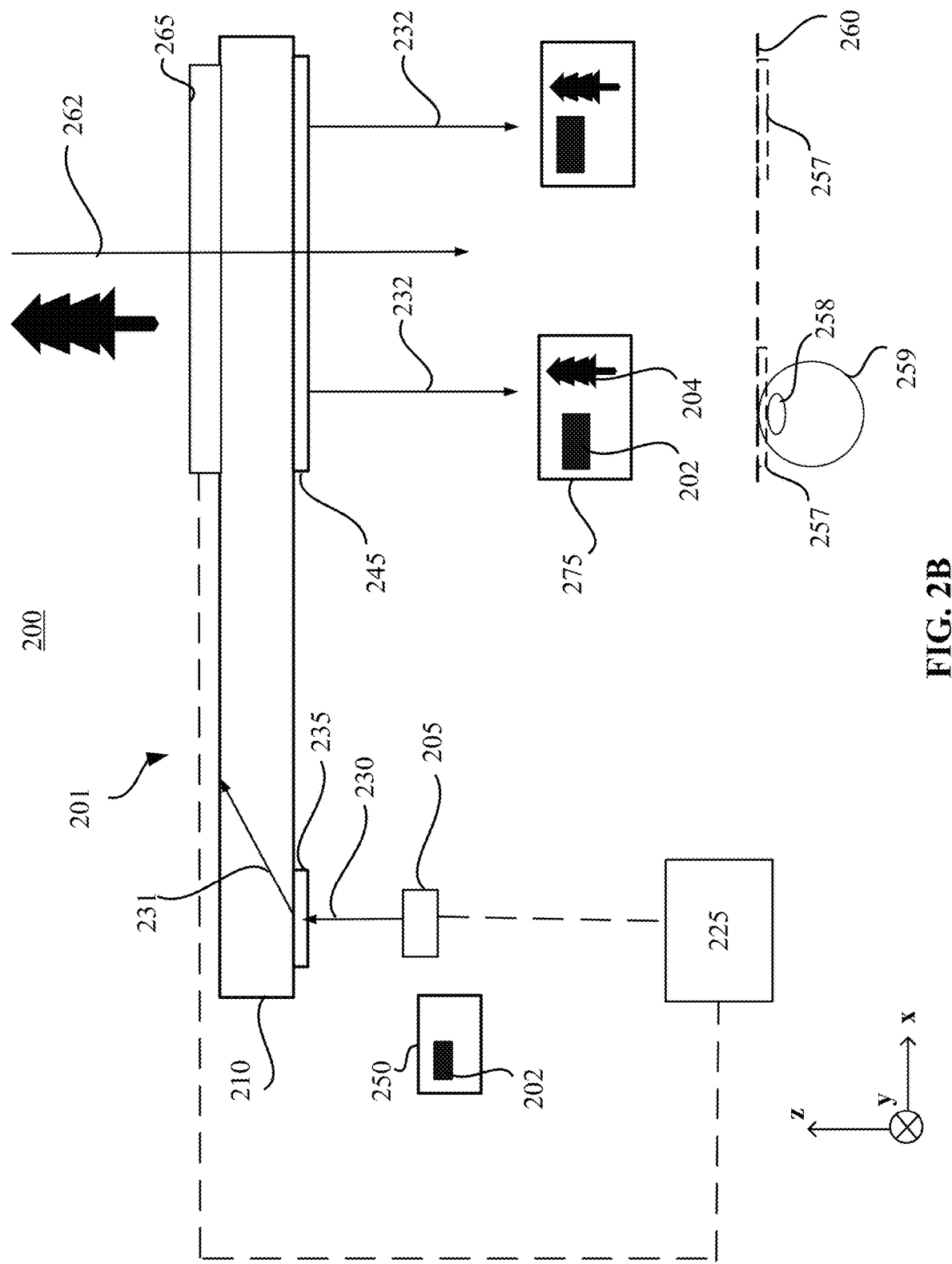

FIGS. 2A and 2B illustrate x-z sectional views of an artificial reality device 200, according to an embodiment of the present disclosure. The artificial reality device 200 may be an embodiment of the artificial reality device 100 shown in FIGS. 1A-1D. As shown in FIG. 2A, the artificial reality device 200 may include a light guide display assembly 201, an active dimming device 265, and a controller 225. The light guide display assembly 201 may include a light source assembly 205, and a light guide 210 coupled with an in-coupling element 235 and an out-coupling element 245. The light source assembly 205 may be configured to output an image light 230 representing a virtual image 250 (e.g., including a virtual object 202). The light guide 210 coupled with the in-coupling element 235 and the out-coupling element 245 may be configured to guide the image light 230 to one or more exit pupils 257 in an eye-box region 260 of the artificial reality device 200. An exit pupil 257 may be a location where an eye pupil 258 of the eye 259 may be positioned in the eye-box region 260. Thus, the eye 259 located at the exit pupil 257 may perceive the virtual image generated by the light source assembly 205. In some embodiments, the in-coupling element 235 may couple the image light 230 into the light guide 210 as the in-coupled image light 231. The out-coupling element 245 may couple the in-coupled image light 231 incident onto different portions of the out-coupling element 245 out of the light guide 210 as a plurality of output image lights 232 propagating toward the eye-box region 260 Each output image light 132 may represent or form a virtual image that may have the same image content as the virtual image 250 output from the light source assembly 205.

The active dimming device 265 may be disposed at an output portion of the light guide 210, spatially overlapping with the out-coupling element 245. The active dimming device 265 may be separately formed and disposed at (e.g., affixed to) at a surface of the light guide 210 facing a real-world environment (e.g., a first surface 210-1), or may be integrally formed as a part of the light guide 210. In some embodiments, the active dimming device 265 and the out-coupling element 245 may be disposed at opposite surfaces of the light guide 210. The light guide 210 may be disposed between the active dimming device 265 and the out-coupling element 245. In some embodiments, an area of the active diming device 265 may be greater than or equal to an area of the out-coupling element 245. In some embodiments, the active dimming device 265 and the out-coupling element 245 may be disposed at the same surface (e.g., the first surface 210-1) of the light guide 210, with the out-coupling element 245 disposed between the active dimming device 265 and the light guide 210. The output image light 232 may not be attenuated by the active dimming device 265.

The active dimming device 265 may be a suitable active dimming device configured to dynamically adjust the transmittance of a visible light from a real world environment (referred to as a real world light 262 hereinafter), thereby dynamically adjusting the transmittance of a see-through view observed through the artificial reality device 200. The active dimming device 265 may attenuate or dim an input light via a suitable dimming mechanisms, such as polarization, absorption, scattering, and/or diffusion, etc. The transmittance or the dimming effect of the active dimming device 265 may be adjustable by a suitable external field, e.g., a mechanical force, an electric field, a magnetic field, or a light, etc. Examples of the active dimming device 265 may include blinds or micro blinds, a guest-host liquid crystal ("LC") dimming device, a polymer stabilized cholesteric LC dimming device, a suspended particle device, an electrochromic diming device, or a photochromic diming device, etc. The active dimming device 265 may be a global or local dimming device.

The controller 225 may be communicatively coupled with the active dimming device 265 to control an operation state of the active dimming device 260. In some embodiments, the controller 225 may control the active dimming device 265 to be switchable between operating in a clear state and a dark state (also referred to as an opaque state). The active dimming device 265 operating in the dark state may be configured to substantially block the real world light 262, e.g., with a light transmittance of less than or equal to about 0.02%, e.g., about 0.01% (or with an optical density of 4). Thus, the user may be immersed in the VR imagery based on computer-generated images. The light transmittance of the active dimming device 265 operating in the dark state may be referred to as a minimum transmittance of the active dimming device 265. For example, the minimum transmittance may be 0.01% or 0.02%.

The active dimming device 265 operating in the clear state may be configured to provide a transmittance that is greater than the minimum transmittance to the real world light 262. In some embodiments, the transmittance in the clear state may be greater than 10%. In some embodiments, the transmittance in the clear state may be adjustable or tunable in a range, or may be a fixed value selected from the range. The range may be from about 10% to about 20%, from about 10% to about 30%, from about 10% to about 40%, from about 10% to about 50%, from about 10% to about 60%, from about 10% to about 70%, from about 10% to about 80%, from about 10% to about 90%, from about 20% to about 30%, from about 20% to about 40%, from about 20% to about 50%, from about 20% to about 60%, from about 20% to about 70%, from about 20% to about 80%, from about 20% to about 90%, from about 30% to about 40%, from about 30% to about 50%, from about 30% to about 60%, from about 30% to about 70%, from about 30% to about 80%, from about 30% to about 90%, from about 40% to about 50%, from about 40% to about 60%, from about 40% to about 70%, from about 40% to about 80%, from about 40% to about 90%, from about 50% to about 60%, from about 50% to about 70%, from about 50% to about 80%, from about 50% to about 90%, from about 60% to about 70%, from about 60% to about 80%, from about 60% to about 90%, from about 70% to about 80%, from about 70% to about 90%, from about 80% to about 90%, etc. In some embodiments, the transmittance in the clear state may be a fixed value, e.g., 35%, or any other suitable value selected in one of the above ranges. In some embodiments, the active dimming device may be configured with a light transmittance of less than or equal to 0.02% in a dark state and a light transmittance of greater than or equal to 10% (e.g., 35%) in a clear state. Thus, the user may perceive a virtual scene superimposed with a real-world scene. For discussion purposes, the predetermined transmittance of the active dimming device 265 operating in the clear state may be referred to as a maximum transmittance of the active dimming device 265, which may be adjustable or fixed. In some embodiments, the controller 225 may control the active dimming device 265 to operate in an intermediate state, in addition to the clear state and the dark state. The active dimming device 265 operating in the intermediate state may provide an intermediate transmittance that is greater than the minimum transmittance provided in the dark state, and less than the maximum transmittance provided in the clear state. For example, in the intermediate state, the intermediate transmittance may be 3%, 4%, 5%, etc.

The active dimming device 265 may be controlled by the controller 225 to dynamically adjust the transmittance of the see-through view observed through the artificial reality device 200, thereby switching the artificial reality device 200 between operating in the VR mode and operating in the AR device, or between operating in the VR device and operating in the MR device. For example, when the controller 225 controls the active dimming device 265 to operate in the dark state, the artificial reality device 200 may be configured to operate in the VR mode. When the controller 225 controls the active dimming device 265 to operate in the clear state or intermediate state, the artificial reality device 200 may be configured to operate in the AR mode or MR mode. In some embodiments, the active dimming device 265 may be configured to dynamically attenuate the real world light 262 depending on the brightness of the real-world environment, thereby adjusting the brightness of the see-through view. For example, when the artificial reality device 200 operates in the AR mode or MR mode, the active dimming device 265 may be configured to adjust the brightness of the see-through view to mitigate the brightness difference between the see-through view and the virtual image that are perceived by the user.

For discussion purposes, FIG. 2A shows that the controller 225 controls the active dimming device 265 to operate in the dark state and, thus, the artificial reality device 200 operates in the VR mode. The active dimming device 265 may substantially block the real world light 262 from being transmitted toward the eye-box region 260. Thus, the eye 259 located at the exit-pupil 257 in the eye-box region 260 may merely perceive a magnified image 255 of the virtual object 202. FIG. 2B shows that the controller 225 controls the active dimming device 2/5 to operate in the clear state or the intermediate state and, thus, the artificial reality device 200 operates in the AR mode or MR mode. The active dimming device 265 may transmit the real world light 262 toward the eye-box region 260. Thus, the eye 259 located at the exit-pupil 257 may perceive an image 275, in which a virtual scene (e.g., the virtual object 202) is superimposed with a real-world scene (e.g., a real world object 204).

FIGS. 3A-3E illustrate x-z sectional views of an artificial reality device 300, according to an embodiment of the present disclosure. The artificial reality device 300 may be an embodiment of the artificial reality device 100 shown in FIGS. 1A-1C. The artificial reality device 300 may include elements, structures, and/or functions that are the same as or similar to those included in the artificial reality device 200 shown in FIGS. 2A and 2B. Descriptions of the same or similar elements, structures, and/or functions can refer to the above descriptions rendered in connection with FIGS. 2A and 2B.

Figure 3A:
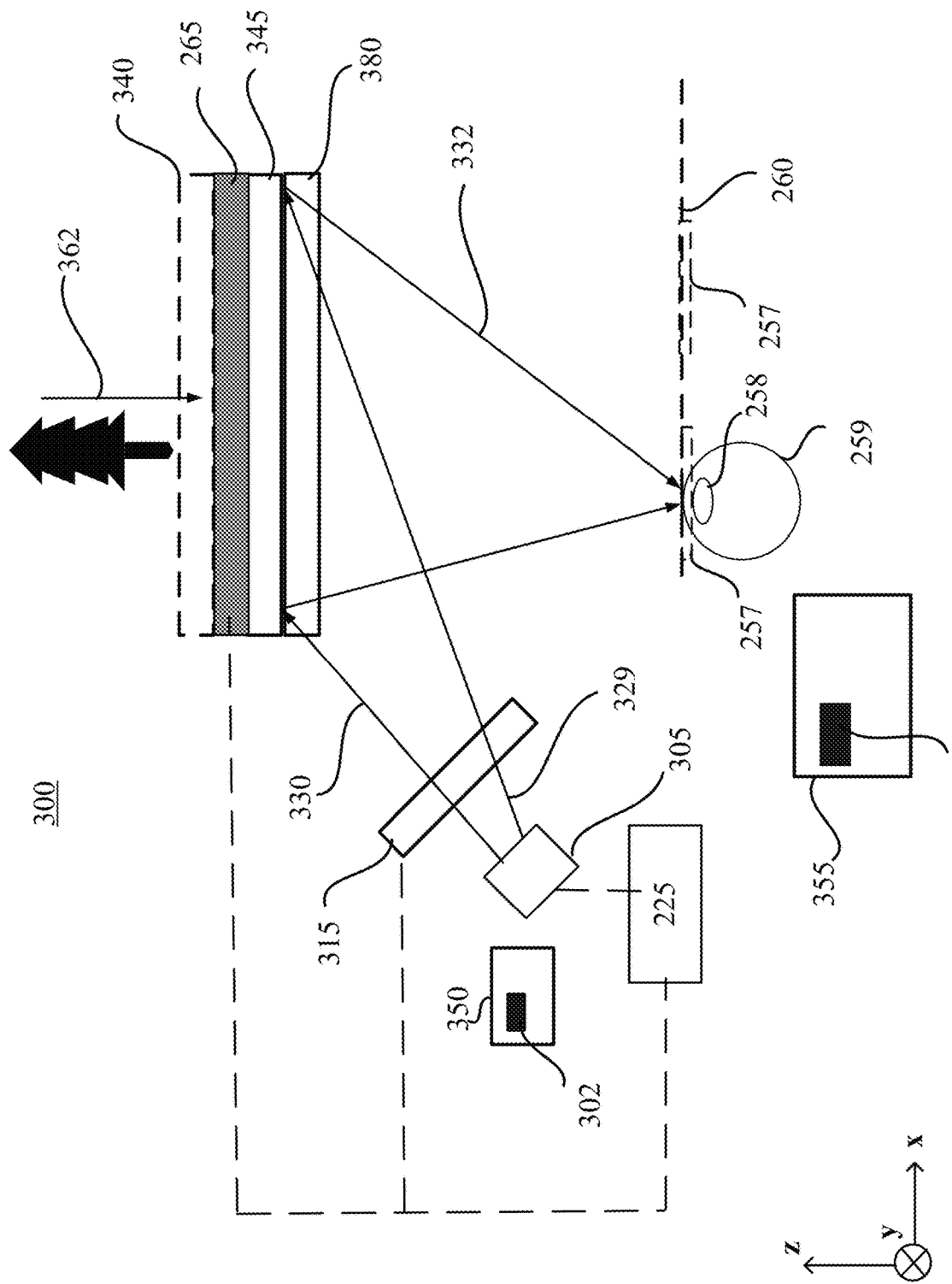
FIGS. 3A-3E illustrate schematic diagrams of an artificial reality device, according to an embodiment of the present disclosure.

As shown in FIG. 3A, the artificial reality device 300 may include a display element 305, a polarization switch 315 optically coupled with the display element 305, a reflective polarizer 345 disposed facing the eye 259, and the active dimming device 265 optically coupled with the reflective polarizer 345. In some embodiments, the display element 305 may be disposed at a left or right side of the head of the user. The display element 305 may include a pico-projector configured to output an image light 329 representing a virtual image 350 (e.g., including a virtual object 302). In some embodiments, the pico-projector may be configured to provide an off-axis projection with respective to the reflective polarizer 345, e.g., the image light 329 may be an off-axis light with respective to the reflective polarizer 345. In some embodiments, the image light 329 output from the pico-projector may be a linearly polarized light. In some embodiments, the image light 329 output from the pico-projector may not be a linearly polarized light, and a linear polarizer (not shown) may be disposed between the pico-projector and the polarization switch 315 to convert the image light 329 into a linearly polarized light. For discussion purposes, the image light 329 shown in FIG. 3A is a linearly polarized light. The polarization switch 315 may be disposed between the display element 305 and the reflective polarizer 345, and may transmit the image light 329 as an image light 330 that is incident onto the reflective polarizer 345 as an off-axis input light.

The polarization switch 315 may be configured to control the polarization of the image light 330 incident onto the reflective polarizer 345. The controller 225 may be communicatively coupled with the polarization switch 315 to control an operation state of the polarization switch 315. In some embodiment, the controller 225 may control the polarization switch 315 to switch between operating in a switching state and a non-switching state. The polarization switch 315 operating in the switching state may change the polarization of the image light 329 to an orthogonal polarization while transmitting the image light 329. That is, the image light 329 and the image light 330 may have orthogonal polarizations. The polarization switch 315 operating in the non-switching state may maintain the polarization of the image light 329 while transmitting the image light 329. That is, the image light 329 and the image light 330 may have the same polarization. In some embodiments, the polarization switch 315 may be synchronized with the active dimming device 265. In some embodiments, the polarization switch 315 may not be synchronized with the active dimming device 265.

In some embodiments, the polarization switch 315 may include a switchable half-wave plate. In some embodiments, the polarization switch 315 may include a twisted-nematic liquid crystal ("TNLC") cell. For example, when the TNLC cell operates at a voltage-on state, the TNLCcell may rotate a polarization direction of a linearly polarized input light by about 90°, while transmitting the linearly polarized input light. When the TNLC cell operates at a voltage-off state, the TNLC cell may maintain the polarization direction of the linearly polarized input light, while transmitting the linearly polarized input light. In some embodiments, the switchable half-wave plate may be a suitable liquid crystal ("LC")-based switchable half-wave plate that includes one or more LC cells, e.g., a Pi cell, a ferroelectric cell, an electronically controlled birefringence ("ECB") cell, a dual ECB cell, etc., or a combination thereof. In some embodiments, the switchable half-wave plate may be electrically driven. For example, the switchable half-wave plate may be electrically coupled with a power source, and the controller 225 may be communicatively coupled with the power source to control an output of the power source. For example, when the switchable half-wave plate operates at a voltage-off state, the switchable half-wave plate may change a polarization direction of a linearly polarized input light to an orthogonal polarization direction, while transmitting the linearly polarized input light. When the switchable half-wave plate operates at a voltage-on state, the switchable half-wave plate may maintain the polarization direction of the linearly polarized input light, while transmitting the linearly polarized input light.

In some embodiments, the switchable half-wave plate may be mechanically driven. For example, the switchable half-wave plate may be mounted on a rotation stage, which may be rotatable around an axis perpendicular to a surface of the switchable half-wave plate. The controller 225 may be communicatively coupled with the rotation stage to control a rotation angle of the rotation stage, thereby controlling an angle of a polarization axis (e.g., a fast axis) of the switchable half-wave plate with respective to the polarization direction of the linearly polarized image light 329. For example, when the angle of the polarization axis of the switchable half-wave plate with respective to the polarization direction of the linearly polarized image light 329 is about 45°, the switchable half-wave plate may change a polarization direction of a linearly polarized input light to an orthogonal polarization direction, while transmitting the linearly polarized input light. When the angle of the polarization axis of the switchable half-wave plate with respective to the polarization direction of the linearly polarized image light 329 is about 0 or 90°, the switchable half-wave plate may maintain the polarization direction of the linearly polarized input light, while transmitting the linearly polarized input light.

In some embodiments, when a linear polarizer is disposed between the switchable half-wave plate and the display element 305 (e.g., pico-projector), the controller 225 may be communicatively coupled with the rotation stage to control a rotation angle of the rotation stage, thereby controlling an angle of a polarization axis (e.g., a fast axis) of the switchable half-wave plate with respective to a transmission axis of the linear polarizer.

In some embodiments, the reflective polarizer 345 may be a linearly reflective polarizer. For example, the reflective polarizer 345 may be configured to substantially reflect a linearly polarized light having a first polarization direction, and substantially transmit a linearly polarized light having a second polarization direction that is orthogonal to the first polarization direction. The reflective polarizer 345 may have a first surface facing the eye-box region 260, and a second surface opposite to the first surface. The active dimming device 265 may be disposed at the second surface of the reflective polarizer 345 facing the real world environment. The active dimming device 265 may dynamically adjust the transmittance of a real world light 362, thereby adjusting the brightness of the see-through view observed through the artificial reality device 200. By adjusting the transmittance of the real world light, the active dimming device 265 may switch the artificial reality device 300 between operating in the VR mode and operating in the AR mode, or between operating in the VR mode and operating in the MR mode.

For discussion purposes, FIG. 3A shows that the image light 329 is a linearly polarized light having the first polarization direction. In FIG. 3A, the artificial reality device 300 may operate in the VR mode. As shown in FIG. 3A, the controller 225 may control the polarization switch 315 to operate in the non-switching state, thereby transmitting the image light 329 as the image light 330 that is a linearly polarized light having the first polarization direction. The reflective polarizer 345 may reflect the image light 330 as an image light 332 propagating toward one or more exit pupils 257 in the eye-box region 260. Thus, the eye 259 located at the exit-pupil 257 may perceive a virtual image that may have the same image content as the virtual image 350 output from the display element 305. The controller 225 may control the active dimming device 265 to operate in the dark state to substantially block the real world light 362 from being transmitted toward the eye-box region 260. Thus, the eye 259 located at the exit-pupil 257 in the eye-box region 260 may merely perceive a magnified image 355 of the virtual object 302.

Figure 3B:
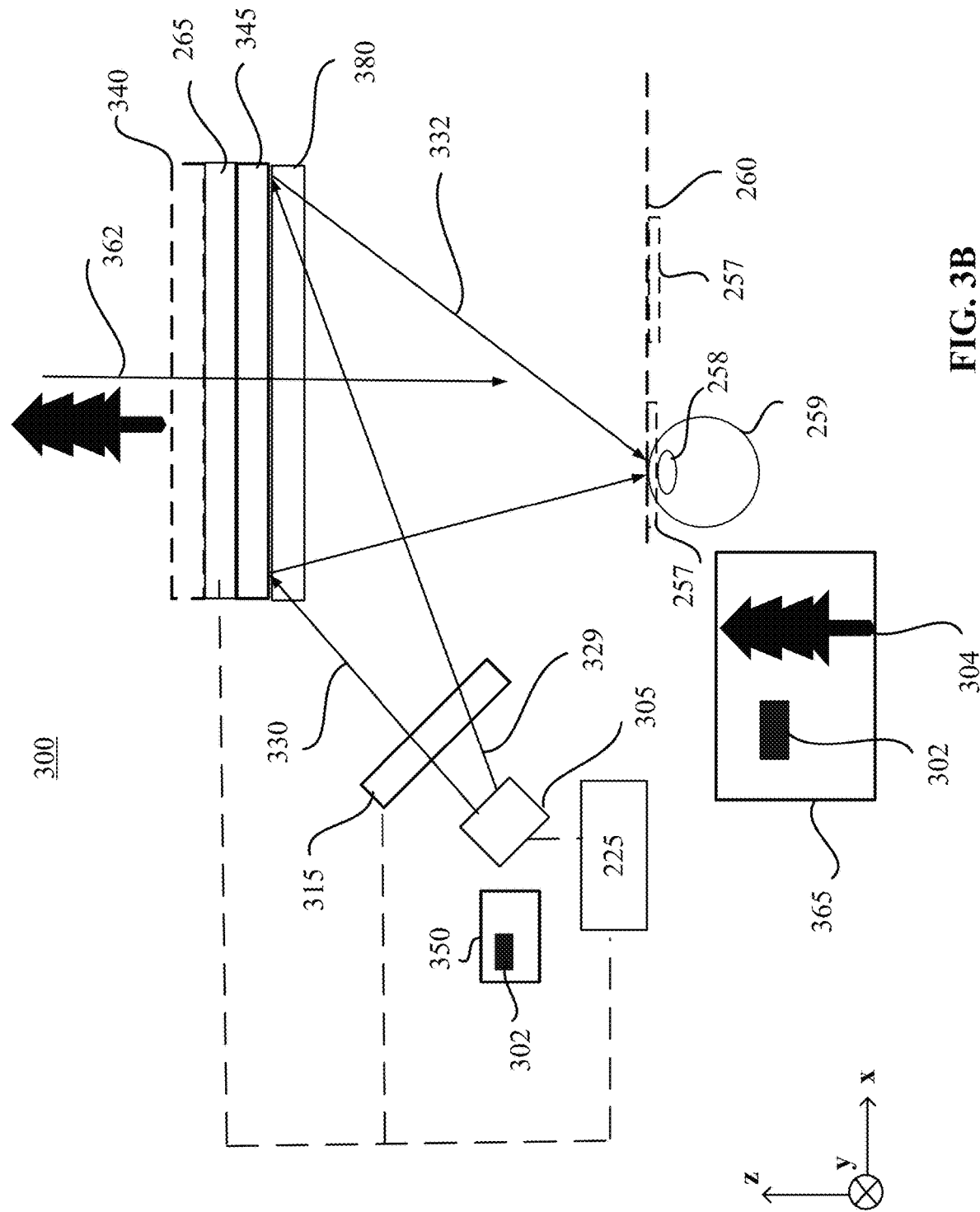

FIG. 3B shows that the artificial reality device 300 operates in the AR mode or MR mode. As shown in FIG. 3B, the controller 225 may control the polarization switch 315 to operate in the non-switching state, thereby transmitting the image light 329 as the image light 330 that is a linearly polarized light having the first polarization direction. The reflective polarizer 345 may reflect the image light 330 as the image light 332 propagating toward one or more exit pupils 257 in the eye-box region 260. In addition, the controller 225 may control the active dimming device 265 to operate in the clear state or the intel mediate state, thereby transmitting the real world light 362 toward the eye-box region 260. Thus, the eye 259 located at the exit-pupil 257 may perceive an image 365, in which a virtual scene (e.g., the magnified virtual object 302) is superimposed with a real-world scene (e.g., a real world object 304).

Referring to FIGS. 3A and 3B, in some embodiments, the artificial reality device 300 may further include a viewing optics assembly 380 disposed at the first surface of the reflective polarizer 345 facing the eye-box region 260. In some embodiments, the viewing optics assembly 380 may include or may be a lens assembly. For discussion purposes, the viewing optics assembly 380 is referred to as a lens assembly 380. The reflective polarizer 345 may reflect the image light 330 as an image light (not shown) propagating toward the lens assembly 380, and the lens assembly 380 may focus the image light reflected from the reflective polarizer 345 as the image light 332 propagating through the exit pupil 257 where the eye 259 may be located.

In some embodiments, the lens assembly 380 may include one or Fresnel lenses (or Fresnel lens arrays), or a folded lens assembly, etc. The Fresnel lens may provide apertures and focal lengths comparable to conventional lenses, with a smaller thickness and weight. The folded lens assembly may be configured to fold an optical path of the image light 332 from the reflective polarizer 345 to the eye-box region 260, thereby increasing the length of the optical path of the image light 332 from the reflective polarizer 345 to the eye-box region 260 without increasing the physical distance between the reflective polarizer 345 and the eye 259. The folded lens assembly may increase a field of view ("FOV") of the artificial reality device 300 without increasing the physical distance between the reflective polarizer 345 and the eye 259 or without compromising the image quality. Examples of the folded lens assembly include a pancake lens assembly, a double pancake lens assembly, a lens assembly including one or more reflective holographic elements, etc. For example, the folded lens assembly may include a first optical element including a quarter-wave plate, a first lens, a first partial reflector (e.g., 50:50 mirror), and a second optical element including a second lens and a second partial reflector (e.g., a reflective polarizer).

In some embodiments, the lens assembly 380 may be configured with an adjustable optical power. For example, the lens assembly 380 may be configured with a large aperture size (such as 50 mm) for a large field of view (such as 65 degrees with 20 mm eye relief distance), a large and continuous adjustment range of optical power for adapting human eye vergence accommodation, a fast switching speed at the milli-seconds level or tens of milliseconds level, and a high image quality for meeting human eye acuity. The lens assembly 380 may include one or more varifocal lenses, such as a mechanical zoom lens stack (which includes at least two lenses with an adjustable distance therebetween), a liquid lens based on a suitable mechanism, a gradient refractive index liquid crystal, or a stack of one or more Pancharatnam-Berry Phase ("PBP") lenses and one or more switchable half-wave plates, etc. In some embodiments, the lens assembly 380 having the adjustable optical power may be configured to correct the off-axis aberration in the image light reflected from the reflective polarizer 345, while transmitting the image light reflected from the reflective polarizer 345. In some embodiments, the lens assembly 380 having the adjustable optical power may also be configured to address an accommodation-vergence conflict in the artificial reality device 300, e.g., based on eye-tracking information received from an object tracking assembly included in the artificial reality device 300 (e.g., the object tracking assembly 190 shown in FIG. 1B).

In some embodiments, the lens assembly 380 may be a first lens assembly 380, and the artificial reality device 300 may also include a second lens assembly 340 disposed at the second surface of the reflective polarizer 345. As shown in FIGS. 3A and 3B, the active dimming device 265 may be disposed between the second lens assembly 340 and the reflective polarizer 345. In some embodiments, the second lens assembly 340 may be disposed between the reflective polarizer 345 and the active dimming device 265. In some embodiments, when the artificial reality device 300 operates in the AR mode or MR mode, the optical powers provided by the second lens assembly 380 and the first lens assembly 340 may be configured to have opposite signs and a substantially same absolute value. Thus, when the artificial reality device 300 operates in the AR mode or MR mode, the second lens assembly 340 may be configured to compensate for the distortion of the real world light 262 caused by the first lens assembly 380, such that images of real-world objects viewed through the artificial reality device 300 may be substantially unaltered.

In some embodiments, the reflective polarizer 345 may be configured with an optical power. The optical power of the reflective polarizer 345 may be fixed or variable. In some embodiments, the optical power of the reflective polarizer 345 may be configured, such that the reflective polarizer 345 may reflect and focus the image light 330 having the first polarization direction as the image light 332 propagating through the exit pupil 257 at which the eye 259 is located. In some embodiments, the reflective polarizer 345 may also be configured to correct the off-axis aberration in the image light 330 while reflecting the image light 330. In such an embodiment, the viewing optics assembly 380 may be omitted. When the artificial reality device 300 operates in the AR mode or MR mode, the optical powers provided by the reflective polarizer 345 and the second lens assembly 340 may have opposite signs and a substantially same absolute value. Thus, when the artificial reality device 300 operates in the AR mode or MR mode, the second lens assembly 340 may be configured to compensate for the distortion of the real world light 262 caused by the reflective polarizer 345, such that images of real-world objects viewed through the artificial reality device 300 may be substantially unaltered.

Figure 3C:
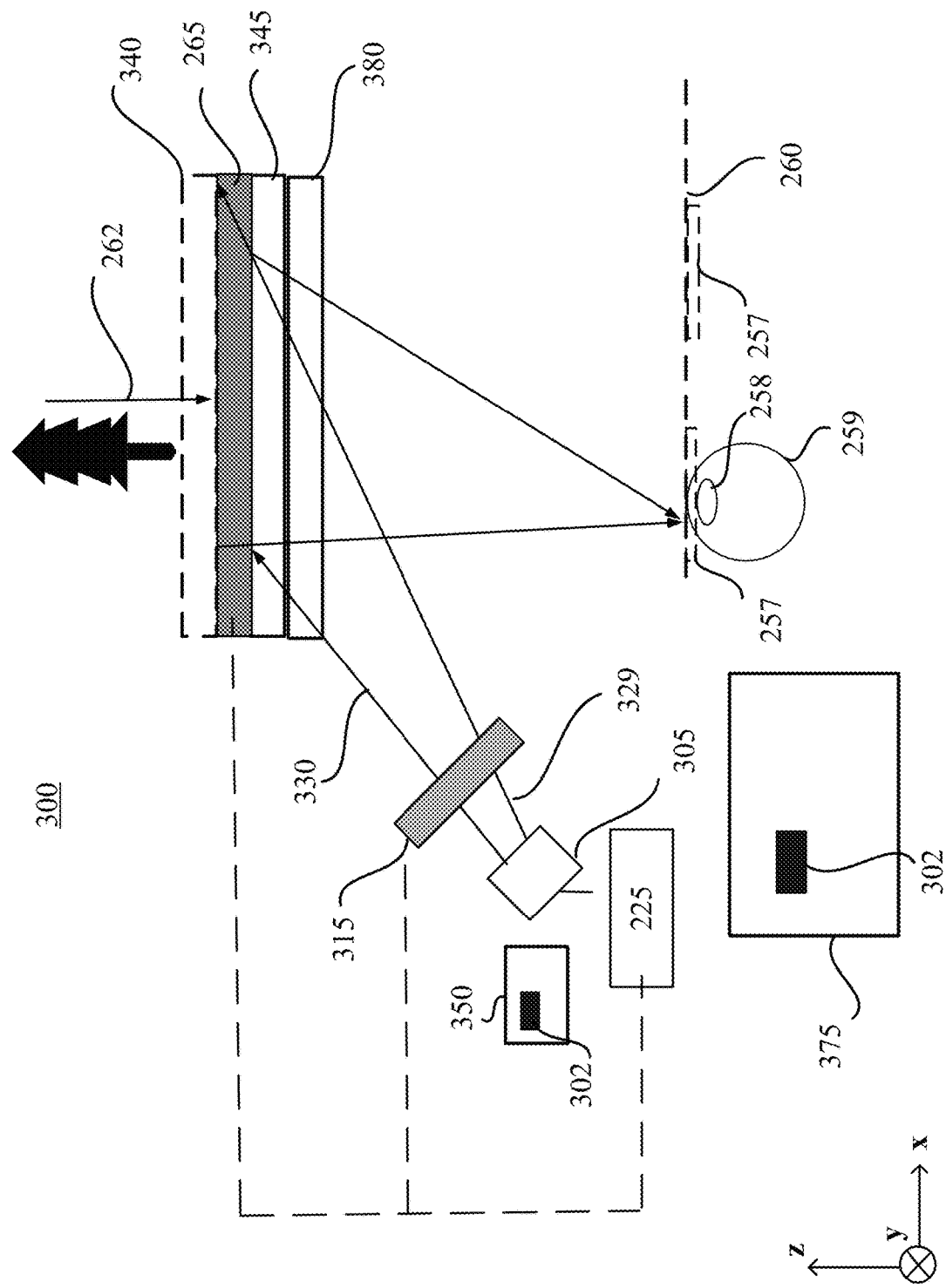

In the embodiment shown in FIG. 3C, the controller 225 may control the polarization switch 315 to operate in the switching state, thereby transmitting the image light 329 as the image light 330 that is a linearly polarized light having the second polarization direction. Thus, the reflective polarizer 345 may substantially transmit the image light 330 having the second polarization direction toward the active dimming device 265. The active dimming device 265 may be configured to attenuate or dim an input light at least via scattering. The controller 225 may control the active dimming device 265 to operate in the dark state. The active dimming device 265 may at least partially backwardly scatter the image light 330 transmitted through the reflective polarizer 345 to the one or more exit pupils 257 in the eye-box region 260. In addition, the active dimming device 265 may substantially block the real world light 362 from being transmitted toward the eye-box region 260. Thus, the eye 259 located at the exit-pupil 257 in the eye-box region 260 may merely perceive a magnified image 375 of the virtual object 302. The artificial reality device 300 may operate in the VR mode.

Figure 3D:
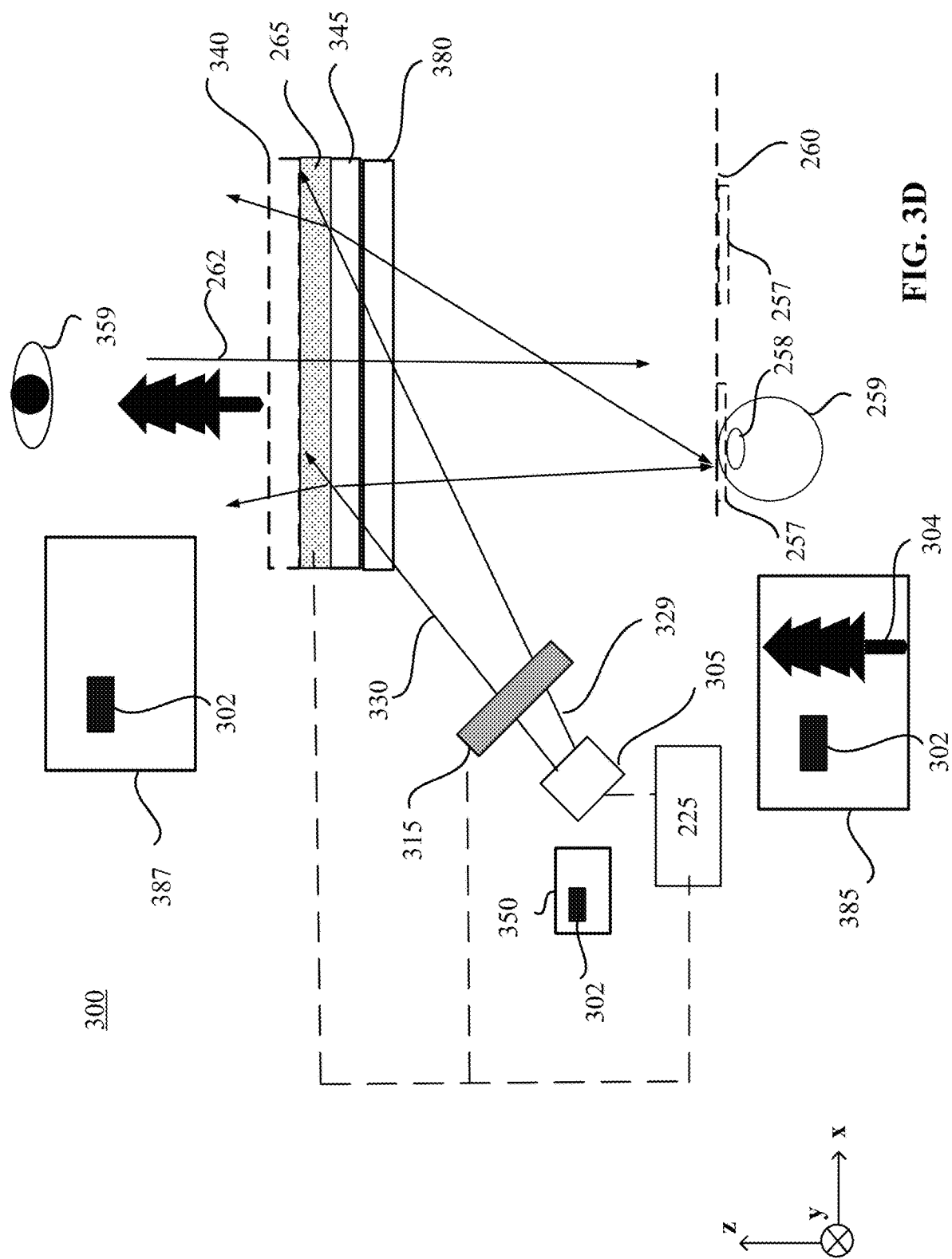

In the embodiment shown in FIG. 3D, the controller 225 may control the polarization switch 315 to operate in the switching state, thereby transmitting the image light 329 as the image light 330 that is a linearly polarized light having the second polarization direction. Thus, the reflective polarizer 345 may substantially transmit the image light 330 having the second polarization direction toward the active dimming device 265. The active dimming device 265 may be configured to attenuate or dim an input light at least via scattering. The controller 225 may control the active dimming device 265 to operate in the intermediate state. In some embodiments, the active dimming device 265 may at least partially backwardly scatter the image light 330 transmitted through the reflective polarizer 345 to the one or more exit pupils 257 in the eye-box region 260. In addition, the active dimming device 265 may at least partially transmit the real world light 362 toward the eye-box region 260. Thus, the eye 259 located at the exit-pupil 257 in the eye-box region 260 may perceive an image 385 in which a virtual scene (e.g., the magnified virtual object 302) is superimposed with a real-world scene (e.g., the real world object 304). The artificial reality device 300 may operate in the AR or MR mode.

In addition, the active dimming device 265 operating in the intermediate state may also at least partially forwardly scatter and/or transmit the image light 330 that has been transmitted through the reflective polarizer 345 to the real world environment. The artificial reality device 300 may have a first side facing the eye 259 of the user (e.g., a first user), and a second side facing the real world environment. In some embodiments, an eye 359 of a second user facing the first user and located at the second side of the artificial reality device 300 may also perceive a magnified image 387 of the virtual object 302. Thus, both of the first user located at the first side of the artificial reality device 300 and the second user located at the second side of the artificial reality device 300 may perceive the virtual object 302 generated by the display element 305 at the same time. In other words, the first user located at the first side of the artificial reality device 300 may be able to share the content generated by the display element 305 with the second user located at the second side of the artificial reality device 300.

Figure 3E:
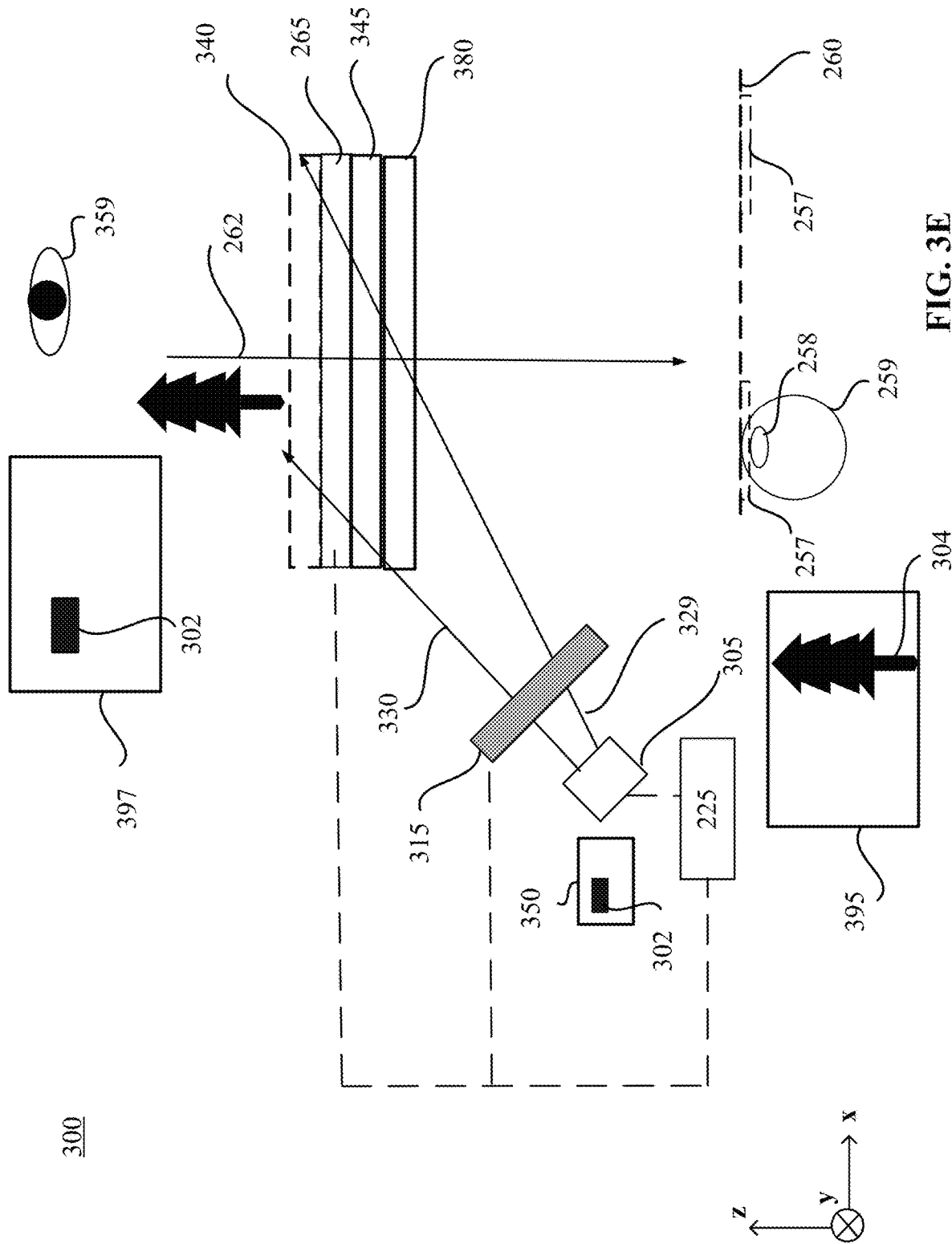

In the embodiment shown in FIG. 3E, the controller 225 may control the polarization switch 315 to operate in the switching state, thereby transmitting the image light 329 as the image light 330 that is a linearly polarized light having the second polarization direction. Thus, the reflective polarizer 345 may substantially transmit the image light 330 having the second polarization direction toward the active dimming device 265. In the embodiment shown in FIG. 3E, the controller 225 may control the active dimming device 265 to operate in the clear state, thereby transmitting the image light 330 toward the real world environment. Thus, the eye 259 located at the exit-pupil 257 may not perceive an image of the virtual object 302. In addition, the active dimming device 265 operating in the clear state may substantially transmit the real world light 262 toward the eye-box region 260. Thus, the eye 259 located at the exit-pupil 257 may merely perceive an image 395 of the real world object 304. In some embodiments, the eye 359 located at the second side of the artificial reality device 300 may merely perceive a magnified image 397 of the virtual object 302.

For discussion purposes, the reflective polarizer 345 is shown in FIGS. 3A-3E as a linear reflective polarizer. In some embodiments, the reflective polarizer 345 may be a circular reflective polarizer configured to substantially reflect a circularly polarized light having a first handedness, and substantially transmit circularly polarized light having a second handedness that is opposite to the first handedness. In some embodiments, the display element 305 (e.g., pico-projector) may output an image light that is a circularly polarized light, and the polarization switch 315 may transmit the image light as a circularly polarized light having the first handedness or a circularly polarized light having the second handedness. In some embodiments, the display element 305 (e.g., pico-projector) may output an image light other than a circularly polarized light, and a circular polarizer (or a stack of a linear polarizer and a quarter-wave plate) may be disposed between the display element 305 and the polarization switch 315 to convert the image light output from the display element 305 into a circularly polarized light propagating toward the polarization switch 315.

Figure 4A:
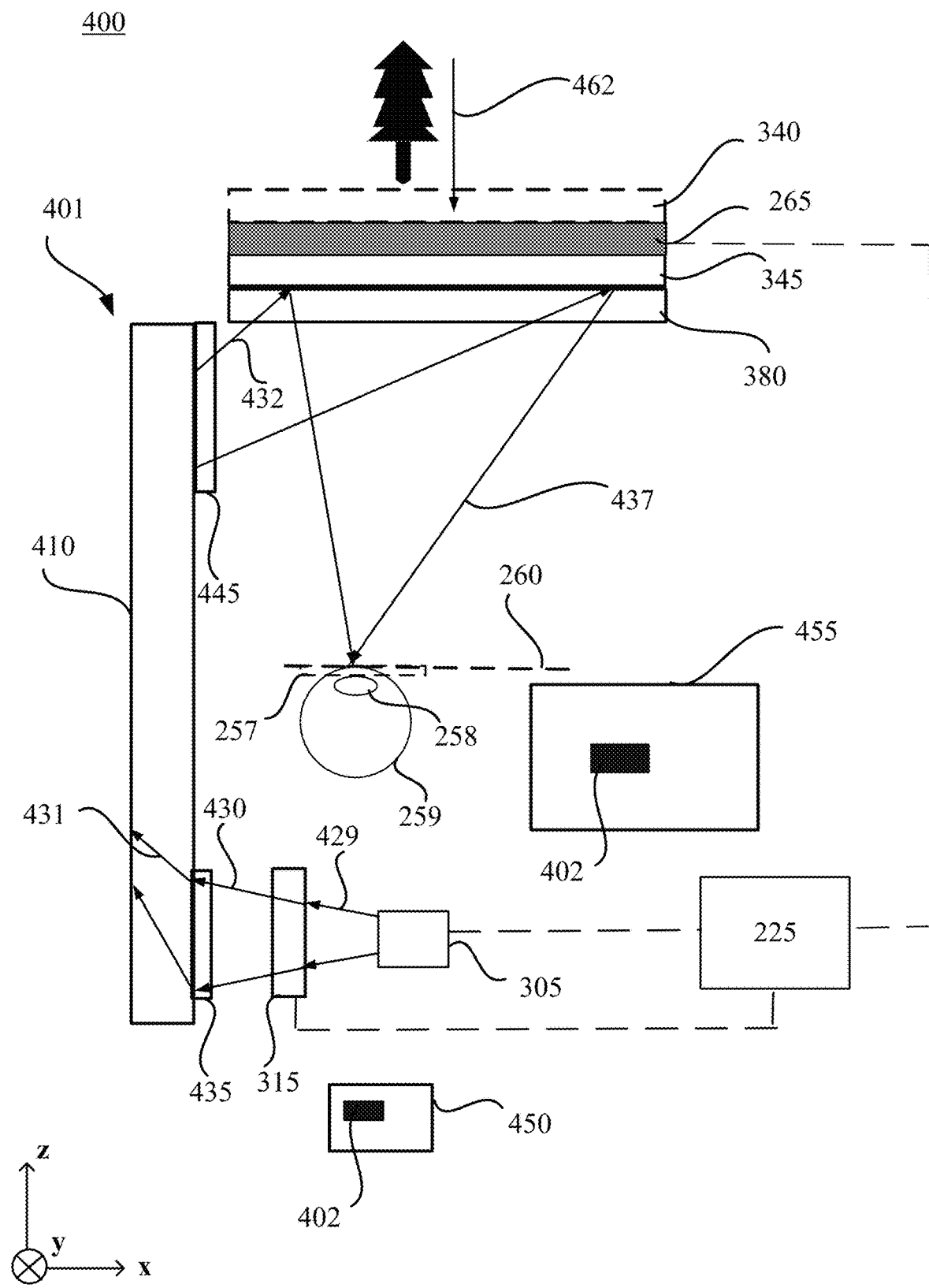
FIGS. 4A-4C illustrate schematic diagrams of an artificial reality device, according to an embodiment of the present disclosure.
Figure 4B:
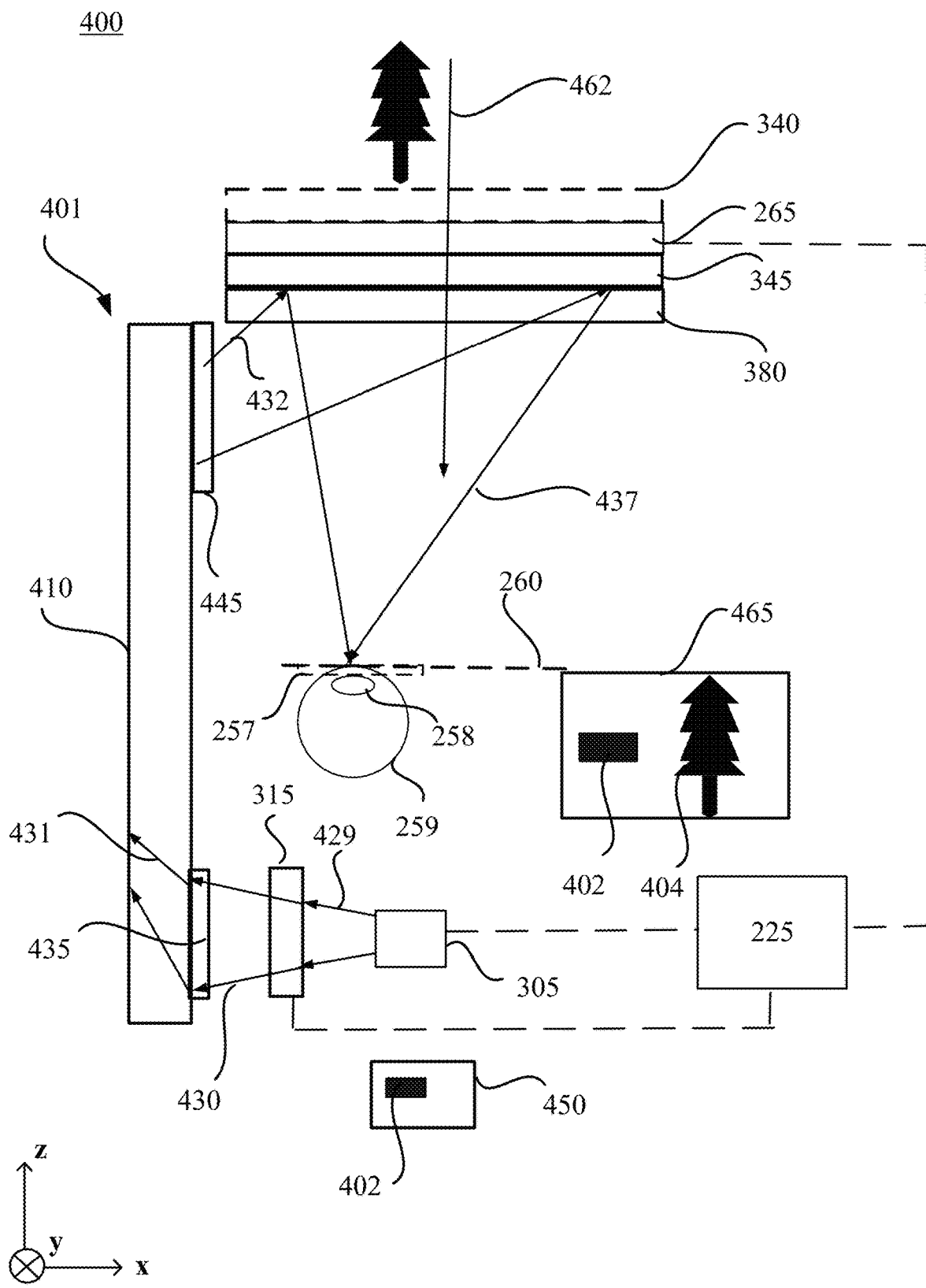
Figure 4C:
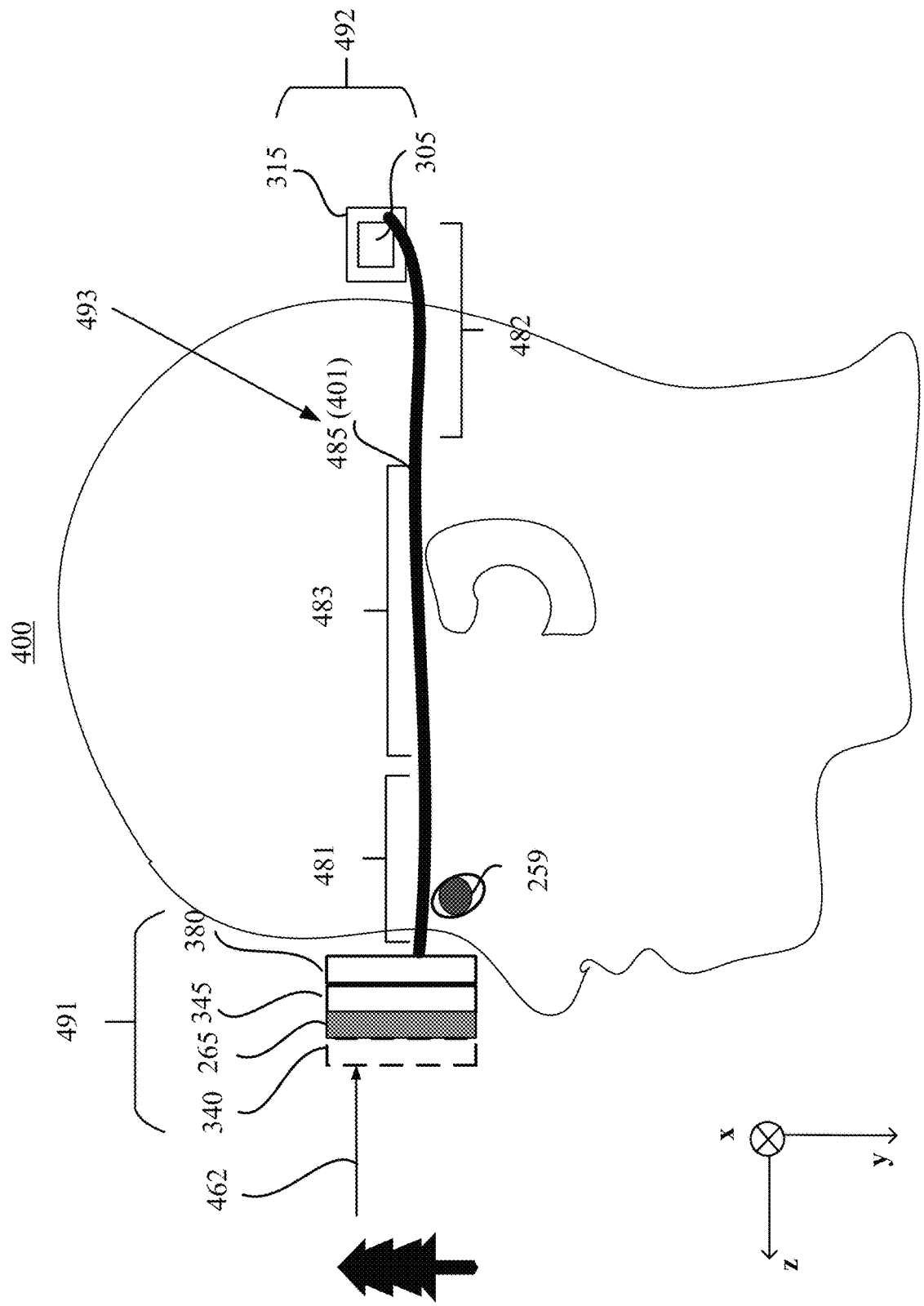

FIGS. 4A and 4B illustrate x-z sectional views of an artificial reality device 400, according to an embodiment of the present disclosure. FIG. 4C illustrates a y-z sectional view (or side view) of the artificial reality device 400 shown in FIG. 4A or FIG. 4B, according to an embodiment of the present disclosure. The artificial reality device 400 may be an embodiment of the artificial reality device 100 shown in FIGS. 1A-1C. The artificial reality device 400 may include elements, structures, and/or functions that are the same as or similar to those included in the artificial reality device 200 shown in FIGS. 2A and 2B, or the artificial reality device 300 shown in FIGS. 3A-3E. Descriptions of the same or similar elements, structures, and/or functions can refer to the above descriptions rendered in connection with FIGS. 2A and 2B, or FIGS. 3A-3E.

Referring to FIG. 4A, the display element 405 may include a pico-projector configured to output an image light 429 representing a virtual image 450 (e.g., including a virtual object 402). The polarization switch 315 may transmit the image light 429 as an image light 430. In some embodiments, the display optics assembly 401 may include a light guide 410, and an in-coupling element 435 and an out-coupling element 445 coupled with the light guide 410. The in-coupling element 435 may be disposed at an input portion of the light guide 410, and may couple the image light 430 output from the polarization switch 315 into the light guide 410 as an in-coupled image light 431. The in-coupled image light may propagate inside the light guide 410 via total internal reflection ("TIR") toward the out-coupling element 445. The out-coupling element 445 may be disposed at an output portion of the light guide 410, and may couple the in-coupled image light 431 out of the light guide 410 as an output image light 432 propagating toward the reflective polarizer 345.

In some embodiments, the polarization of the in-coupled image light 431 may be substantially maintained when the in-coupled image light 431 propagates inside the light guide 410 via TIR toward the out-coupling element 445. In some embodiments, the polarization of the in-coupled image light 431 may change when the in-coupled image light 431 propagates inside the light guide 410 via TIR toward the out-coupling element 445. In some embodiments, the light guide 410 may also be coupled with one or more retardation films disposed at one or more surfaces of the light guide 410. The retardation film may be configured to maintain the polarization of the in-coupled image light 431, when the in-coupled image light 431 propagates inside the light guide 410 via TIR toward the out-coupling element 445.

For discussion purposes, the image light 429 is shown in FIG. 4A as a linearly polarized light having the first polarization direction. The controller 225 may control the polarization switch 315 to operate in the non-switching state, thereby transmitting the image light 429 as the image light 430 that is a linearly polarized light having the first polarization direction. The light guide 410 coupled with the in-coupling element 435 and the out-coupling element 445 may guide the image light 430 as the image light 432 propagating toward the reflective polarizer 345. The image light 432 may also be a linearly polarized light having the first polarization direction. Thus, the reflective polarizer 345 may reflect the image light 432 as an image light 437 propagating toward one or more exit pupils 257 in the eye-box region 260. Thus, the eye 259 located at the exit-pupil 257 may perceive a virtual image that may have the same image content as the virtual image 450 output from the display element 305. The controller 225 may control the active dimming device 265 to operate in the dark state to substantially block (e.g., via reflection or absorption) a real world light 462 from transmitting toward the eye-box region 260, and the artificial reality device 400 may operate in the VR mode. Thus, the eye 259 located at the exit-pupil 257 in the eye-box region 260 may merely perceive a magnified image 455 of the virtual object 402.

The artificial reality device 400 may provide an increased distance to unfold the optical path of the image light from the display element 305 to the eye-box region 260. Thus, the artificial reality device 400 may provide a reduced focal length for a virtual image generated by the display element 305. The artificial reality device 400 may include the display element 305 disposed at a rear portion of the head of the user (at least behind the ear). This configuration may help balance the weight distribution of the artificial reality device 400. Compared to a conventional artificial reality device in which all or most of the optical elements are included in a module worn to the forehead of the user, or disposed at a side (left and/or right) of the head and in front of the ear, the weight distribution of the artificial reality device 400 may be more balanced. Accordingly, the user of the artificial reality device 400 may have an improved wearing experience of the artificial reality device 400.

FIG. 4B shows the artificial reality device 400 operating in the AR mode or MR mode. As shown in FIG. 4B, the controller 225 may control the polarization switch 315 to operate in the non-switching state, thereby transmitting the image light 429 as the image light 430 (a linearly polarized light having the first polarization direction) toward the in-coupling element 435. The light guide 410 coupled with the in-coupling element 435 and the out-coupling element 445 may guide the image light 430 as the image light 432 propagating toward the reflective polarizer 345. The reflective polarizer 345 may reflect the image light 432 as the image light 437 propagating toward one or more exit pupils 257 in the eye-box region 260. In addition, the controller 225 may control the active dimming device 265 to operate in the clear state or the intermediate state, thereby transmitting the real world light 462 toward the eye-box region 260. Thus, the eye 259 located at the exit-pupil 257 may perceive an image 465 in which a virtual scene (es., the magnified virtual object 402) is superimposed with a real-world scene (e.g., a real world object 404). The artificial reality device 400 may also operate in other modes, similar to that shown in FIGS.

3C-3E. The details may refer to the above descriptions rendered in connection with FIGS. 3C-3E.

FIG. 4C schematically illustrates a side view of the artificial reality device 400 mounted to a head of a user. The artificial reality device 400 is shown as an eye-glass style for illustration purposes. For discussion purposes, the optical elements included in the artificial reality device 400 may be grouped into three optics assemblies, a front optics assembly 491, a rear optics assembly 492, and a connecting optics assembly 493. The connecting optics assembly 493 may also be referred to as an intermediate optics assembly 493. The front optics assembly 491 may include optical elements disposed in front of the head (or face, eye) of the user. The rear optics assembly 492 may include optical elements disposed at a position at least behind the ear of the user (e.g., behind the head or at a rear side of the head behind the ear). The connecting optics assembly 493 may include optical elements disposed between the front optics assembly 491 and the rear optics assembly 492.

In some embodiments, the front optics assembly 491 may include the reflective polarizer 345, the active dimming device 265, the second lens assembly 340, and the viewing optics assembly 380. In some embodiments, the front optics assembly 491 may include additional elements not shown in FIG. 4C. The rear optics assembly 492 may include the display element 305 (e.g., a pico-projector) and the polarization switch 315. In some embodiments, the rear optics assembly 492 may include additional elements not shown in FIG. 4C.

The connecting optics assembly 493 may be configured to guide lights to propagate between the rear optics assembly 492 and the front optics assembly 491. For example, the connecting optics assembly 493 may include the display optics assembly 401 shown in FIGS. 4A and 4B. The display optics assembly 401 may include a light guide (e.g., 410 shown in FIG. 4A or 4B, which is not separately labelled in FIG. 4C), an in-coupling element (e.g., 435 shown in FIG. 4A or 4B), and an out-coupling element (e.g., 445 shown in FIG. 4A or 4B). The light guide coupled with the in-coupling element and the out-coupling element may guide an image light output from the display element 305 (e.g., a pico-projector) located behind the ear (e.g., at a rear portion of the head) to the reflective polarizer 345 located adjacent the eye 259. In some embodiments, the connecting optics assembly 493 may include other elements.

The artificial reality device 400 may include a frame 485 (also referred to as a mounting frame 485). For illustrative purposes, the frame 485 is shown as an eye-glass type frame. Other suitable type of mounting fixtures may be used in place of or in combination with the frame 485. The front optics assembly 491, the connecting optics assembly 493, and the rear optics assembly 492 may be mounted to different portions of the frame 485. The frame 485 may extend from a position adjacent an eye of the user to a position at least behind an ear of the user. In some embodiments, the frame 485 may extend to a side rear portion of the head behind the ear, or to a position behind a rearmost point of the head. For discussion purposes, the frame 485 may be roughly divided into a front frame portion 481, a rear frame portion 482, and a middle frame portion 483. The front frame portion 481 may be a portion that is positioned in front of an ear and adjacent an eye 259. The rear frame portion 482 may be a portion that is entirely positioned behind the ear of the user. The middle frame portion 483 may be a portion between the front frame portion 481 and the rear frame portion 482. In some embodiments, the middle frame portion 483 may span above the ear, i.e., a portion of the middle frame portion 483 may be in front of the ear and a portion of the middle frame portion 483 may be behind the ear. The front optics assembly 491 may be mounted to the front frame portion 481. The rear optics assembly 492 may be mounted to the rear frame portion 482. The connecting optics assembly 493 may be mounted to at least the middle frame portion 483. In some embodiments, the connecting optics assembly 493 may be mounted to the middle frame portion 483, or may form the part of or the entire middle frame portion 483. In some embodiments, the connecting optics assembly 493 may be mounted to portions of the front frame portion 481, the middle frame portion 483, and the rear frame portion 482. In some embodiments, the light guide included in the connecting optics assembly may extend along the frame 485 between the rear optics assembly 492 and the front optics assembly 491.

In conventional head-mounted artificial reality systems, most of the optical elements may be disposed at a front portion of a frame, which may cause the front portion of the frame to be much heavier, which may adversely affect user experience. In the present disclosure, the rear optics assembly 492, including the display element 305, may be disposed at the rear frame portion 482 at a rear portion of the head (at least behind the ear), such that the weight distribution may be more balanced.

Figure 5A:
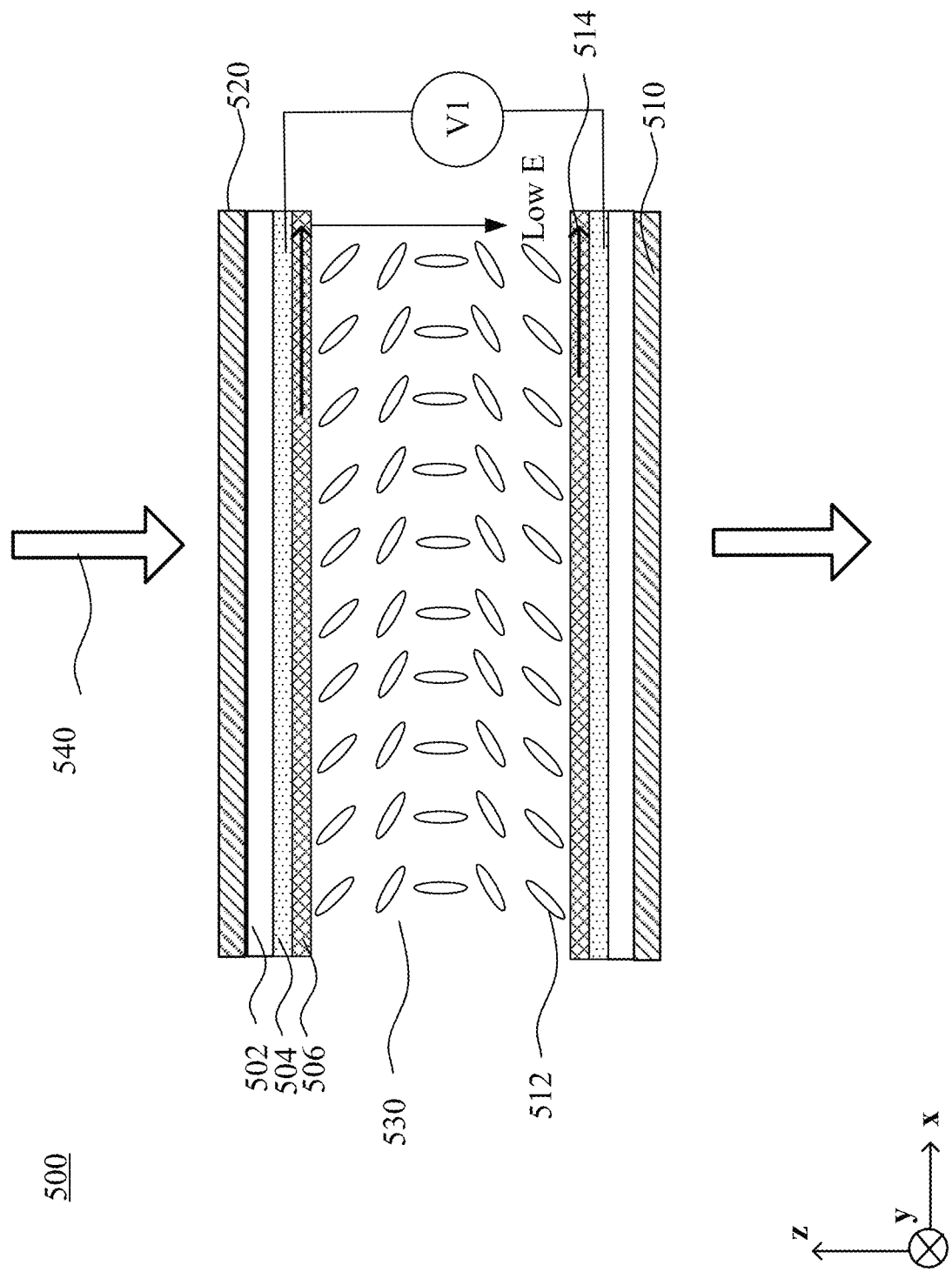
FIGS. 5A and 5B illustrate schematic diagrams of an active dimming device, according to an embodiment of the present disclosure.
Figure 5B:
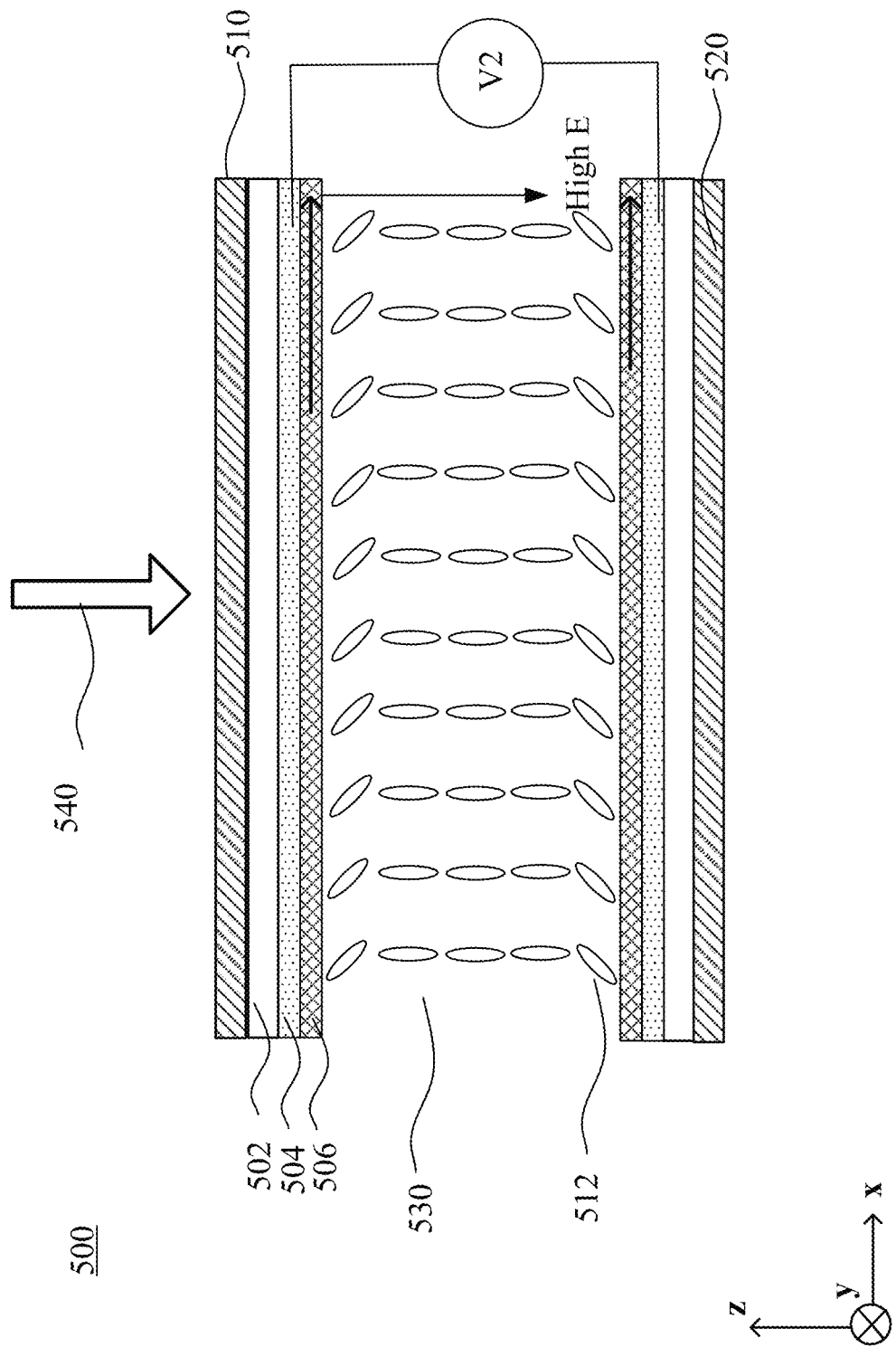

In the following, exemplary active dimming devices will be explained. The active dimming device may attenuate an input light via a suitable dimming mechanisms, such as polarization, absorption, and/or scattering, etc. An active dimming device based on polarization may include a liquid crystal display ("LCD") that has a single large cell or "pixel" that covers the entire display area. Examples of active dimming devices based on polarizations may include a nematic LC dimming device, a ferroelectric LC ("FLC") dimming device, a guest-host LC dimming device, a polymer stabilized blue phase LC ("BPLC") dimming device, etc. A nematic LC dimming device including a Pi-cell may have a relatively fast switching speed, e.g., the transition between the clear state and the dark state may have a relatively short duration. FIGS. 5A and 5B illustrate x-z sectional views of an active dimming device 500 according to an embodiment of the disclosure. The active dimming device 500 may be a Pi-cell LC dimming device. As shown in FIG. 5A, the active dimming device 500 may include a first linear polarizer 510 (referred to as a polarizer), a second linear polarizer 520 (referred to as an analyzer), and an LC cell 530 disposed between the polarizer 510 and the analyzer 520. The polarizer 510 and the analyzer 520 may be crossed linear polarizers, e.g., a transmission axis of the polarizer 510 may be arranged orthogonal to a transmission axis of the analyzer 520. In some embodiments, the transmission axes of the polarizer 510 and the analyzer 520 may be disposed at angles of plus or minus 35° to 55° with respect to an alignment direction of the LC cell 530. In some embodiments, the transmission axes of the polarizer 510 and the analyzer 520 may be disposed at angles of plus or minus 45° with respect to an alignment direction of the LC cell 530.

The LC cell 530 may include upper and lower substrates 502 arranged opposite to one another. The substrates 502 may be substantially transparent in the visible band (about 380 nm to about 700 nm). In some embodiments, the substrates 502 may also be transparent in some or all of the IR band (about 700 nm to about 1 mm). The substrates 502 may include a suitable material that is substantially transparent to the light of above-listed wavelengths range, e.g., glass, plastic, sapphire, etc. A conductive electrode 504 such as an indium tin oxide ("ITO") electrode may be disposed on opposing surfaces of the substrates 502 to apply an electric field to the LC cell 530.

An alignment layer 506 may be disposed on opposing surfaces of the electrodes 504, and an LC layer including nematic LC molecules 512 may be disposed between the two alignment layers 506. The two alignment layers 506 may be configured with a homogeneous parallel alignment direction, for example, in an x-direction indicated by an arrow 514, through which the nematic LC molecules 512 near the upper and lower substrates 502 may be oriented in parallel directions. The directors of the LC molecules 512 may be twisted by 180° from one substrate 502 to the other substrate 502, formed by the parallel alignment direction (e.g., parallel rubbing direction) on the two substrates 502. As a comparison, in a TNLC cell, the alignment directions on two substrates are perpendicular to each other and, thus, a 90° twist of LC directors from one substrate to the other is formed inside the TNLC cell.

When a relatively low electric field is applied (e.g., when a relatively low voltage $V_1$ (e.g., $V_1=2V$) is applied), as shown in FIG. 5A, the LC cell 500 may operate at a bend state, in which the LC molecules 512 at the middle of the LC layer are reoriented by the electric field E to be perpendicular to the substrates 502, while other LC molecules 512 are still oriented parallel to the alignment direction 512 because of the surface constraints. In some embodiments, a polarization direction of an incident light 540 may be parallel to the transmission axis of the polarizer 510. After propagating through the LC cell 530, the polarization direction of the incident light 540 may be rotated by 90° to be parallel to the transmission axis of the analyzer 520, such that the incident light 540 may be transmitted through the analyzer 520, realizing a clear state of the LC dimming device 500.

When a relatively high electric field is applied (e.g., when a relatively high voltage $V_2$ (e.g., $V_2=10$ V) is applied), as shown in FIG. 5B, the LC cell 530 may be switched to a homeotropic state, in which the majority of the LC molecules 512 are reoriented by the electric field E to be perpendicular to the substrates 502. After propagating through the LC cell 530, the polarization direction of the incident light 540 may substantially remain the same, which is perpendicular to the transmission axis of the analyzer 520. Thus, the incident light 540 may be blocked by the analyzer 520, realizing a dark state of the LC dimming device 500. Through switching the LC cell 530 between a relative low voltage state (e.g., a bend state) and a relative high voltage state (e.g., a homeotropic state), the active dimming device 500 may be switched between a clear state and an opaque state, and the switching time may be substantially short, e.g., in the order of milli-seconds.

When a voltage between the relatively high voltage $V_2$ and the relatively low voltage $V_1$ is applied to the LC cell 530 (not shown), the LC cell 530 may operate in state between the homeotropic state and the bend state. After propagating through the LC cell 530, the polarization direction of the incident light 540 may be rotated by less than 90° and greater than 0°, such that the incident light 540 may be partially transmitted through the analyzer 520, realizing an intermediate state of the LC dimming device 500.

Figure 6A:
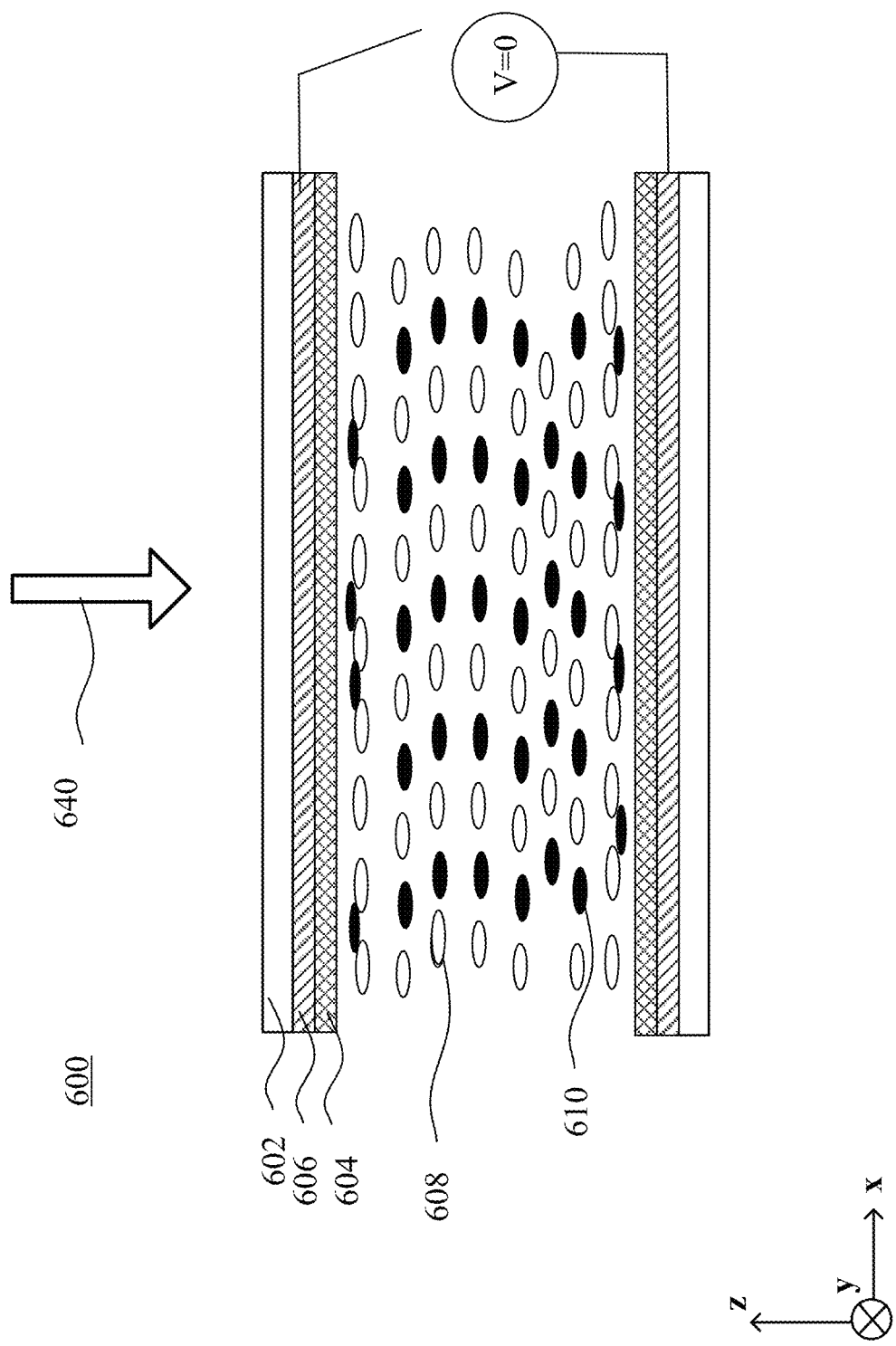
FIGS. 6A and 6B illustrate schematic diagrams of an active dimming device, according to an embodiment of the present disclosure.
Figure 6B:
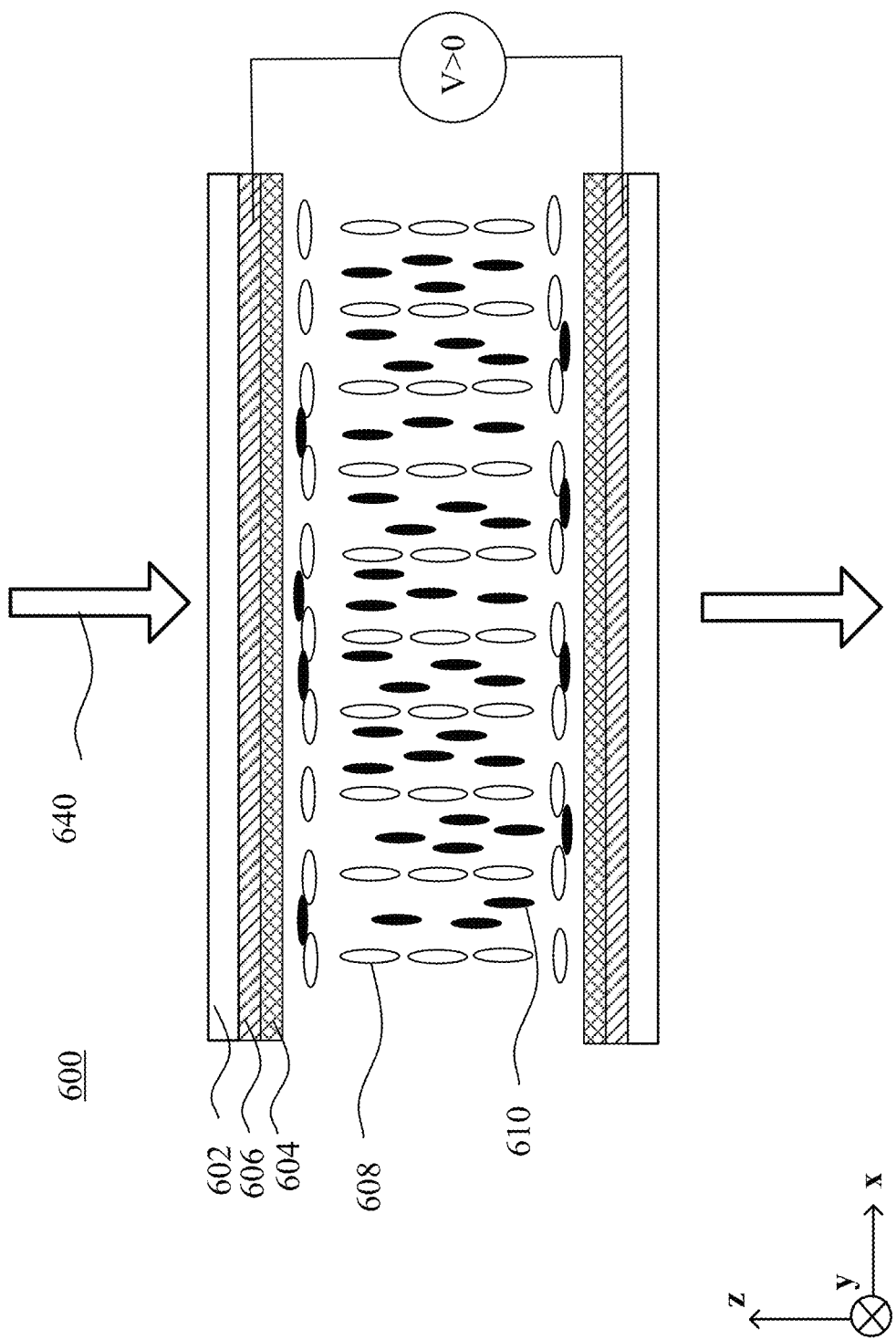

FIGS. 6A and 6B illustrate x-z sectional views of an active dimming device 600, according to an embodiment of the disclosure. The active dimming device 600 may be a guest-host type LC dimming device. As shown in FIG. 6A, the active LC dimming device 600 may include two opposite substrates 602 and an LC layer disposed between the two opposite substrates 602. Each substrate 602 may be provided with a transparent electrode 606 and an alignment layer 604. The LC layer may be a guest-host LC layer that includes a mixture of host LCs 608 and guest dyes (e.g., dichroic dyes) 610 doped into the LCs 608.

The dichroic dyes 610 may be organic molecules having an anisotropic absorption. The absorption properties of the dichroic dyes 610 may depend on a relative orientation between an absorption axis of the dichroic dyes 610 (e.g., long axis or short axis of the dye molecules) and a polarization direction of an incident light. For example, the dichroic dyes 610 may strongly absorb an incident light having a polarization direction that is parallel to an absorption axis (e.g., long axis or short axis) of the dye molecules 610, and weakly absorb the incident light having a polarization direction that is perpendicular to the absorption axis (e.g., long axis or short axis) of the dye molecules 610. Thus, through varying the orientation of the dye molecules 610 via, e.g., an electric field, the transmittance of the incident light 640 may be adjusted.

The LCs 608 in the LC layer may have positive or negative dielectric anisotropy. For illustrative purposes, FIGS. 6A and 6B show that the LCs 608 have positive dielectric anisotropy ($\Delta\varepsilon>0$). The dye molecules (also referred to as 610) may be aligned together with the LC molecules 608 in an x-axis direction at a voltage-off state. As shown in FIGS. 6A and 6B, when the directors of the LCs 608 change from a planar orientation to a perpendicular orientation along with an applied voltage V, the long molecular axis of the dyes 610 may also change the orientation along with the LCs 608. In other words, the dyes 610 may change from a planar orientation (a strong absorption state) at V=0 to a perpendicular orientation (a weak absorption state) at V≠0. Accordingly, the active LC dimming device 600 may be switched from operating at a dark state at V=0 to operating at a clear state at V≠0. In some embodiments, the LCs 608 may have negative dielectric anisotropy ($\Delta\varepsilon<0$), and the opaque state and the transparent state of the active LC dimming device 600 may be reversed, e.g., the active LC dimming device 600 may operate at the clear state at V=0 and operate at the dark state at V≠0. The active LC dimming device 600 may be free of polarizers. In addition, flexible substrates may be used in the guest-host LC dimming device, which may increase design flexibility of the overall NED design.

Figure 7A:
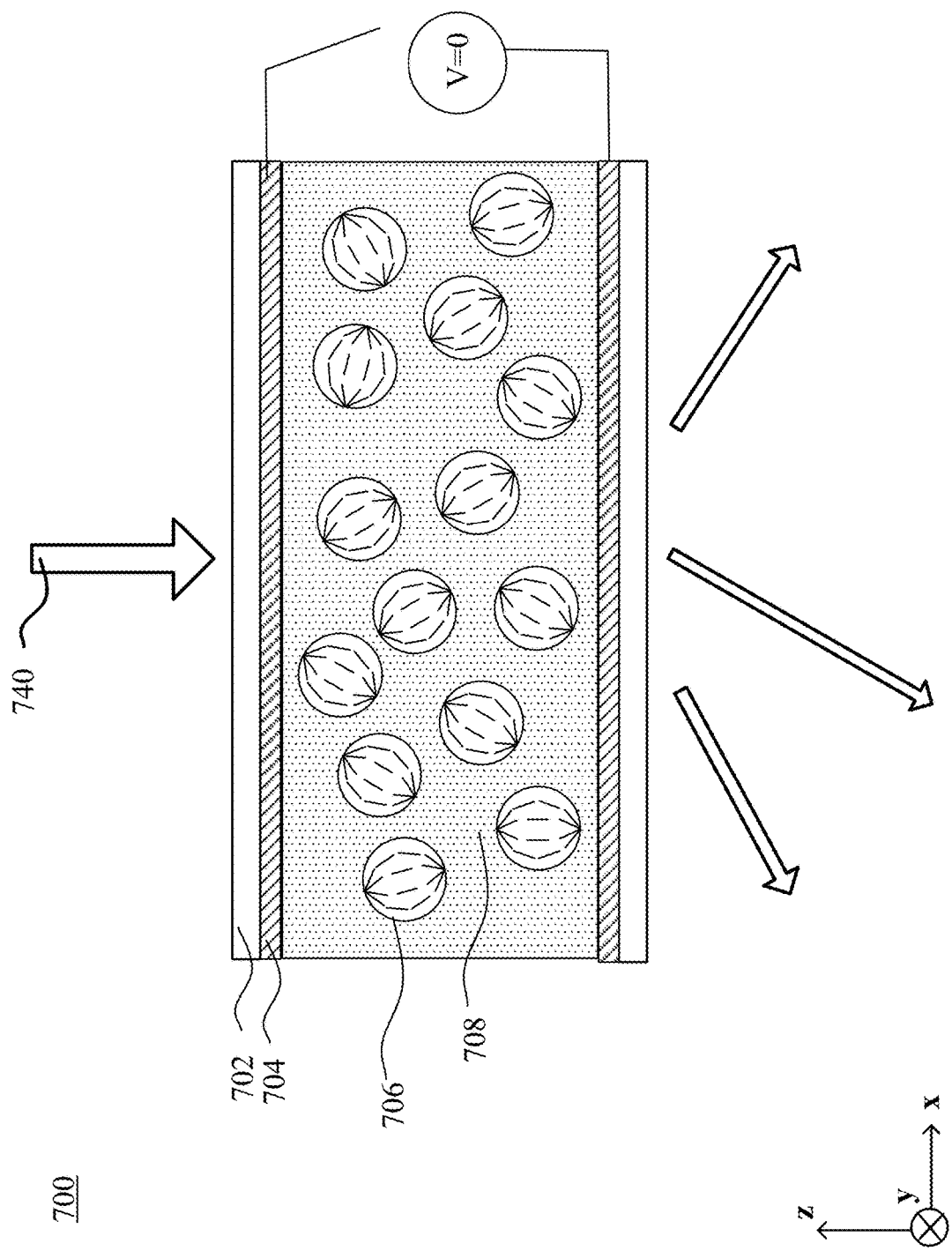
FIGS. 7A and 7B illustrate schematic diagrams of an active dimming device, according to an embodiment of the present disclosure.
Figure 7B:
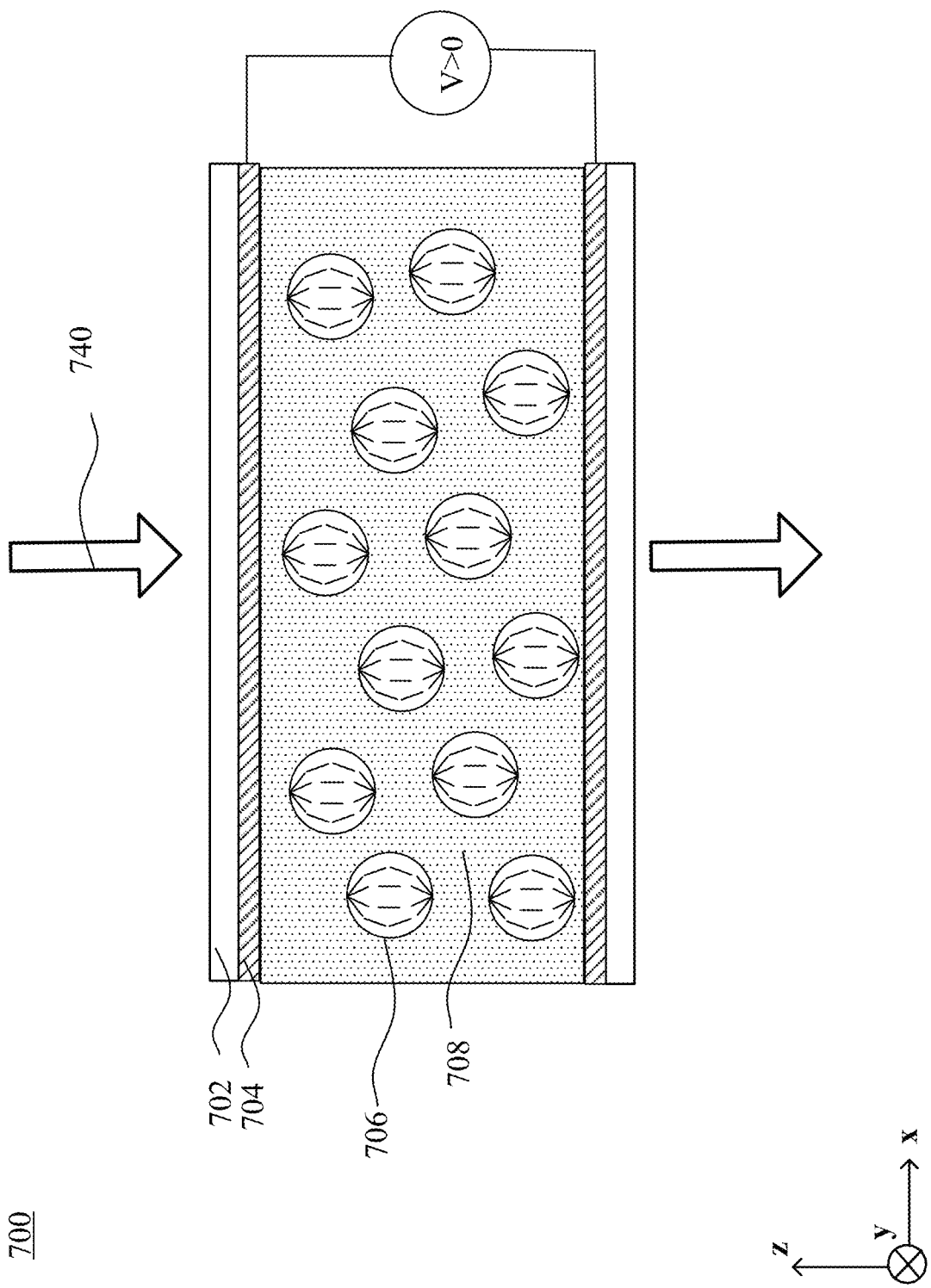

FIGS. 7A and 7B illustrate x-z sectional views of an active dimming device 700 according to an embodiment of the disclosure. The active dimming device 700 may be polymer dispersed liquid crystal ("PDLC") dimming device 700. As shown in FIG. 7A, the active dimming device 700 may include two opposite substrates 702 and a PDLC layer disposed between the two substrates 702. Each substrate 702 may be provided with a transparent electrode 704, such as an ITO electrode, for applying a voltage to the PDLC layer. The PDLC layer may be a composite material layer that includes micro-sized nematic LC droplets 706 randomly dispersed in an optically isotropic polymer matrix 708. The LC droplet 706 may have a bipolar configuration that exhibits a dielectric anisotropy. The ordinary refractive index no of the LCs within the LC droplets 706 may be chosen to be sufficiently close to (including match) refractive index np of the polymer matrix material. In some embodiments, the active dimming device 700 may work without polarizers.

In a voltage-off state, as shown in FIG. 7A, the symmetry axis of each LC droplet 706 may be in general randomly oriented. The difference between the refractive index of the polymer matrix material and the effective refractive index of the LCs may result in the scattering of a substantially normally incident light 740, giving the active dimming device 700 a milky appearance. Thus, the active dimming device 700 may operate in a dark state. In a voltage-on state, as shown in FIG. 7B, an electric field may be applied along the normal direction of the PDLC layer, the symmetry axis of the LC droplets 706 having LCs of positive dielectric anisotropy may be reoriented by the electric field, and trend to be parallel to the electric field direction. Because the ordinary refractive index no of the LCs is sufficiently close to (or match) the refractive index np of the polymer matrix material, the substantially normally incident light 740 may encounter negligible variation of refractive index. Thus, the incident light 740 may be transmitted through the PDLC layer with negligible scattering. The active dimming device 700 may operate in a clear state. Through varying the amplitude of the applied electric field, the active dimming device 700 may be continuously tuned from being opaque to being almost transparent. After removing the electric field, the anchoring force of the polymer on the LCs may restore the LC droplets 706 to the original orientation, and the active dimming device 700 may appear milky again.

A polymer network liquid crystal ("PNLC") dimming device may include a PNLC layer disposed between two opposite substrates. Each substrate may be provided with a transparent electrode, such as an ITO electrode, for applying a voltage to the PNLC layer. In some embodiments, the PNLC layer may include nematic LCs. The operation principle of the PNLC dimming device may be similar to the PDLC dimming device, and the operating voltage of the PNLC dimming device may be reduced compared to the PDLC dimming device, due to a relatively low polymer concentration in the PNLC layer. The switching speed of the PNLC dimming device may be further improved by using sheared PNLC, where the PNLC layer is subjected to a shearing force parallel to the substrates. The shearing force may orient the polymer chains within the PNLC in the direction of the shearing movement. The resulting sheared PNLC dimming device may have a switching speed at the level of tens of milli-seconds.

In some embodiments, the PNLC layer may include cholesteric LCs, and the pitch of the cholesteric LC may be a few micrometers. In some embodiments, the PNLC layer may not be coupled with alignment layers. Polymerization of monomer in the cholesteric LC may occur when a relatively high voltage is applied to the LC cell. The voltage may unwind the cholesteric structure, and reorient the LC molecules to the homeotropic state (e.g., LC directors being perpendicular to the substrate). The polymer network may be formed perpendicular to the substrate in the direction of homeotropically aligned cholesteric LCs under the relatively high voltage. After the polymerization, in a voltage-off state, the cholesteric LCs may tend to have a helical structure, while the polymer network may tend to keep the LC directors parallel to the polymer network. The competition between the two factors may result in a focal conic texture. The PNLC layer may have a polydomain structure that may be optically scattering, realizing a dark state of the PNLC dimming device. In a voltage-on state, the LCs with positive dielectric anisotropy ($\Delta\varepsilon>0$) may be switched to the homeotropic texture, and the incident light may experience the ordinary reflective index no of LCs that is matched with the refractive index np of the polymer. Thus, the incident light may be transmitted through the PNLC layer with negligible scattering, realizing a clear state of the PNLC dimming device.

Figure 8A:
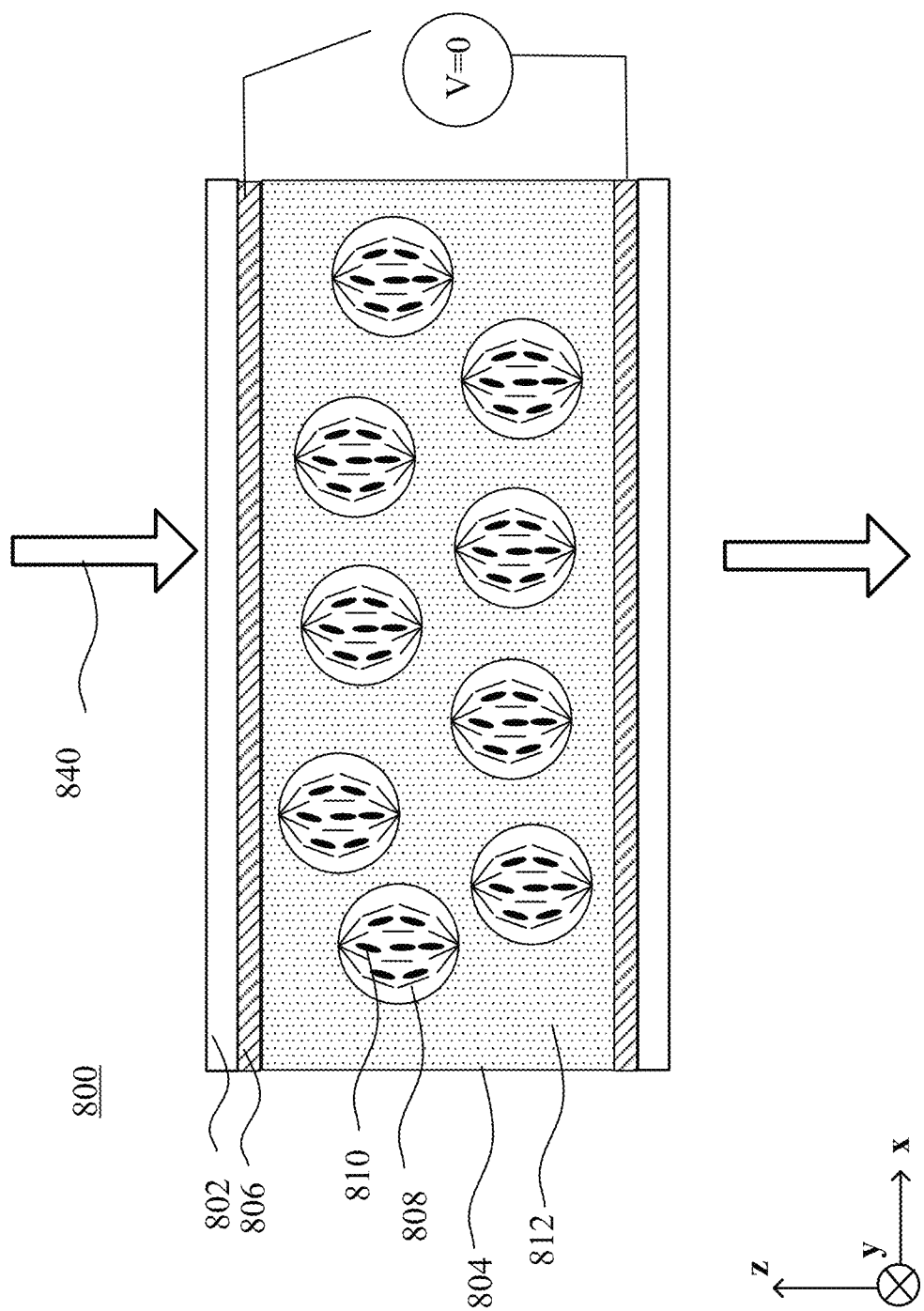
FIGS. 8A and 8B illustrate schematic diagrams of an active dimming device, according to an embodiment of the present disclosure.
Figure 8B:
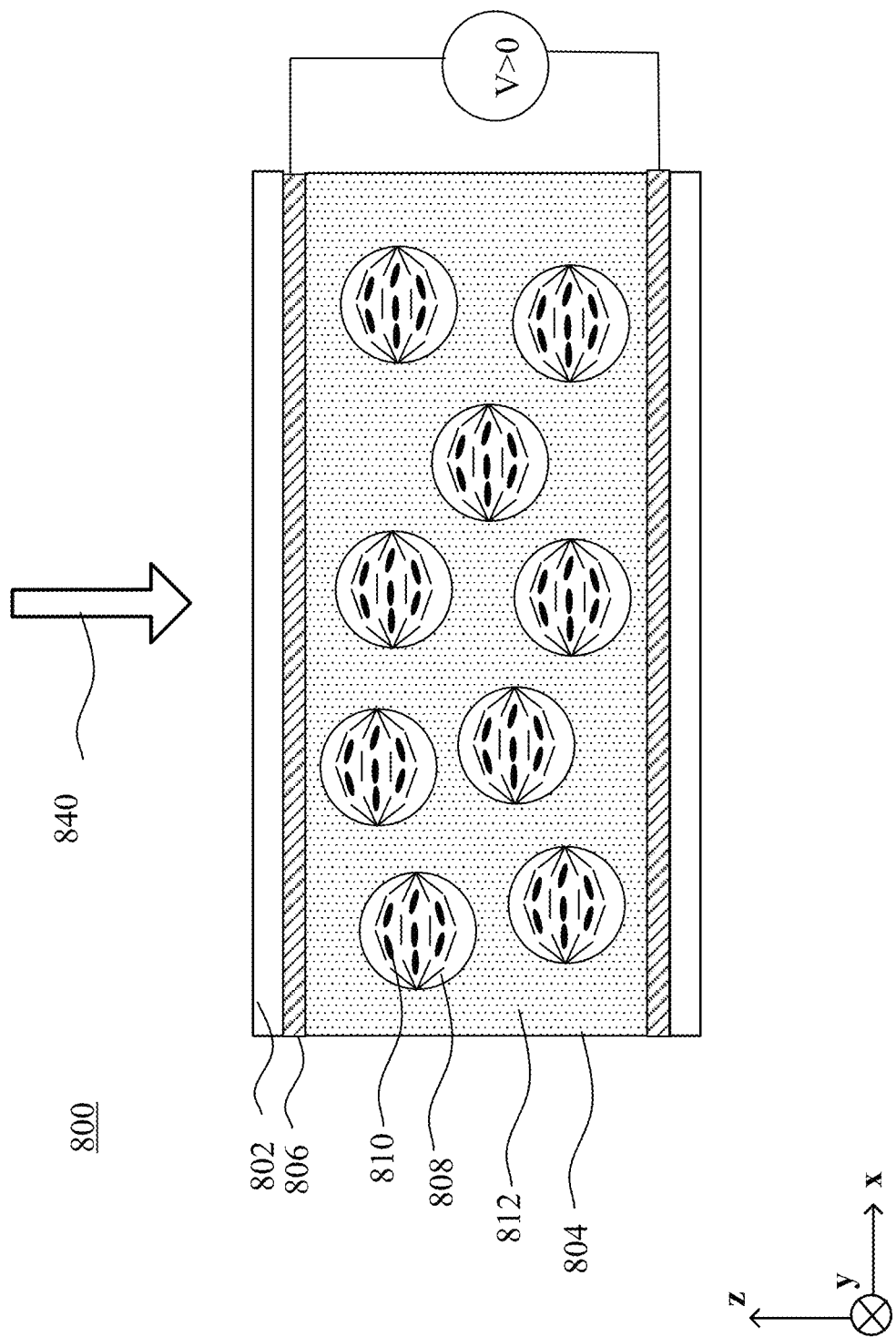

FIGS. 8A and 8B illustrate x-z sectional views of an active dimming device 800 according to an embodiment of the disclosure. The active dimming device 800 may be an LC dimming device based on scattering and absorption. As shown in FIG. 8A, the active dimming device 800 may include two opposite substrates 802, and a composite layer 804 of PDLC (or PNLC) doped with dyes (e.g., dichroic dyes) disposed between the two substrates 802. Each substrate may be provided with a planar transparent electrode 806, e.g., an ITO electrode. Each electrode 806 may be provided with an alignment layer (not drawn), through which LC molecules 808 with negative dielectric anisotropy ($\Delta\varepsilon<0$) may be homeotropically (or vertically) aligned. Dye molecules 810 may align together with the LC molecules 808. The dye molecules 810 may have an absorption axis in the long axis.

In a voltage-off state, as shown in FIG. 8A, the LC molecules 808 and the dye molecules 810 may be vertically aligned. A substantially normally incident light 820 (e.g., an unpolarized light) may be weakly absorbed by the dye molecules 810. In addition, because the ordinary refractive index no of the LCs is sufficiently close to (or match) the refractive index np of the polymer matrix material, the substantially normally incident light 820 may encounter negligible variation of refractive index. Thus, the incident light 820 may be transmitted through with negligible scattering. A clear state of the active dimming device 800 may be realized.

In a voltage-on state, as shown in FIG. 8B, a vertical electric field may be generated across the composite layer 804. The LC molecules 808 may be reoriented by the electric field to be parallel to the substrate 802. The dye molecules 810 may also be reoriented along with the LC molecules 808. Thus, the orientation of the absorption axis of the dye molecules 810 may be changed, for example, from the weakly-absorbing/homeotropic orientation to the strongly-absorbing/homogeneous orientation. Accordingly, the incident light 820 may be strongly absorbed. In addition, the difference between the refractive index of the polymer matrix material and the effective refractive index of the LCs may result in the scattering of the incident light 820. Thus, a dark state of the active dimming device 800 may be realized.

Figure 9A:
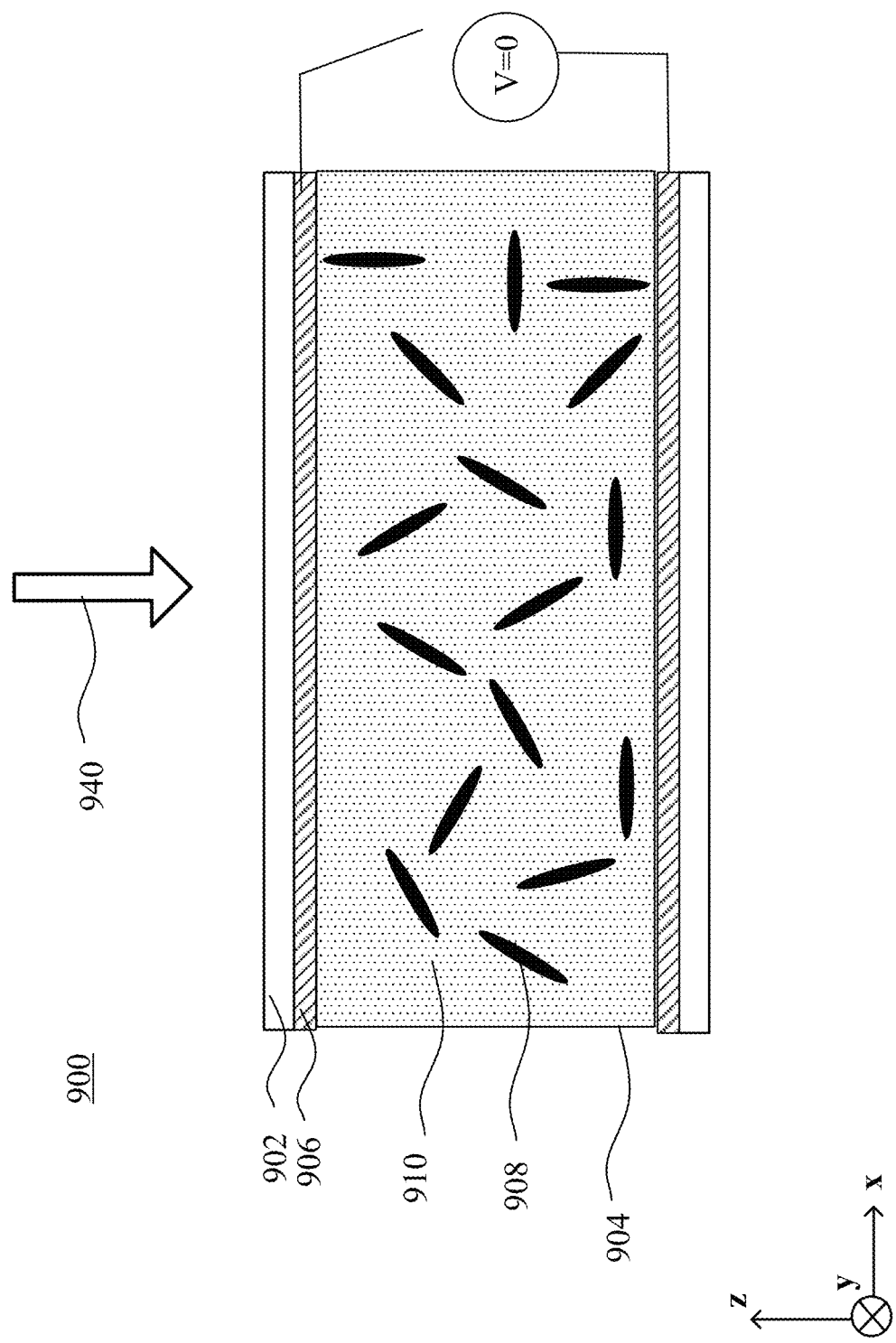
FIGS. 9A and 9B illustrate schematic diagrams of an active dimming device, according to an embodiment of the present disclosure.
Figure 9B:
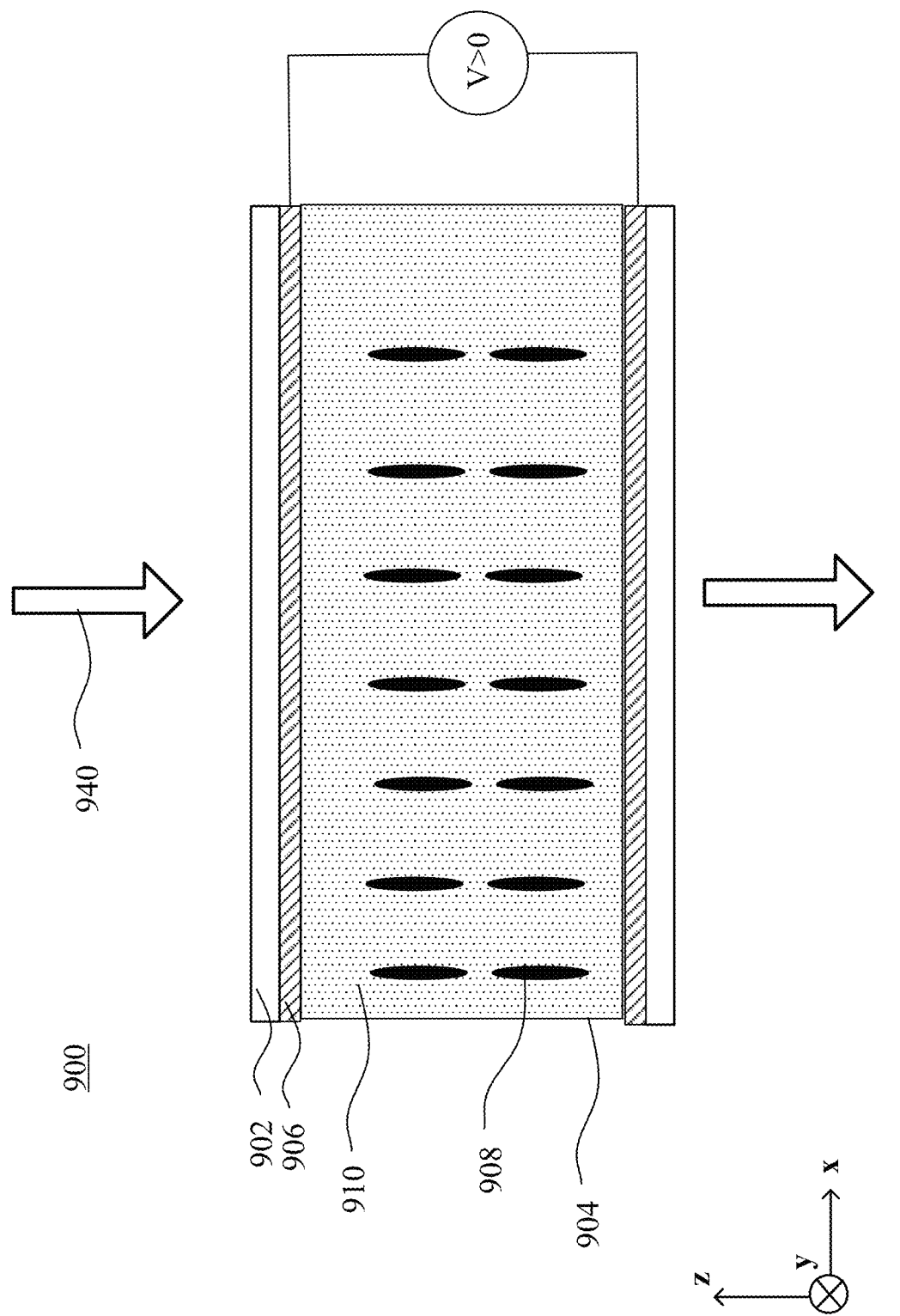

FIGS. 9A and 9B illustrate x-z sectional views of an active dimming device 900 according to an embodiment of the disclosure. The active dimming device 900 may be a suspended particle device. As shown in FIG. 9A, the active dimming device 900 may include two opposite substrates 902, and a composite layer 904 disposed between the two substrates 902. The composite layer 904 may include microscopic light-absorbing particles 908 suspended in a liquid suspension or film 910. For example, the particles 908 may include dihydrocinchonidine bisulfite polyiodide, or herapathite, etc. The particle 908 may be needle-shaped, rod-shaped, or lath-shaped, etc. Each substrate 902 may be provided with a transparent electrode 906, e.g., an ITO electrode. In a voltage-off state, as shown in FIG. 9A, the particle 908 may be randomly aligned due to Brownian movement, and may substantially absorb an incident light 940. Thus, the active dimming device 900 may operate in a dark state. In a voltage-on state, as shown in FIG. 9B, when the applied voltage is sufficiently high, the particle 908 may be substantially aligned in a same direction, e.g., a z-axis direction in FIG. 9B, and allow the incident light 940 to be substantially transmitted thorough. Thus, the active dimming device 900 may operate in a clear state. As the applied voltage gradually decrease, the transmittance of the active dimming device 900 may gradually decrease. After removing the voltage, the particle 908 may move back into a random pattern and substantially block the incident light 940.

In some embodiments, the active dimming device disclosed herein may be switched to operate in different states by applying different voltages. For example, when the dimming effect is based on absorption, the control voltage may range from 0 V to 18 V, 0 V to 20 V, 0 V to 22 V, or 0 V to 25 V, etc. The dark state transmission may be 0.01%, 0.02%, etc. The clear state transmittance may be around 10%, 11%, 12%, 13%, 15%, etc. In the clear state, the haze (or scattering) may be around 0.3%, 0.4%, 0.5%, 0.6%, etc. In the dark state, the haze may be minimal (e.g., around 0%). In some embodiments, when the dimming effect is based on absorption, the inventors have discovered that the dimming device may provide VR experience regardless of its dependency on polarization and/or incident angle.

In some embodiments, the present disclosure provides a device. The device includes a reflective polarizer configured to selectively reflect or transmit a polarized light based on a polarization of the polarized light. The device also includes a display element disposed at a first side of the reflective polarizer, and configured to output a first image light representing a virtual image. The device also includes a polarization switch disposed between the display element and the reflective polarizer, and configured to switch or maintain a polarization of the first image light. The device also includes an active dimming device disposed at a second side of the reflective polarizer, and configured to provide an adjustable transmittance of an input light. In some embodiments, the active dimming device is a global or local dimming device. In some embodiments, the polarization switch is configured to transmit the first image light as a second image light that is incident onto the reflective polarizer as an off-axis incident light. In some embodiments, the device further includes a controller configured to control the polarization switch to switch between outputting the second image light having a first polarization and outputting the second image light having a second polarization orthogonal to the first polarization. In some embodiments, the reflective polarizer is configured to substantially reflect the second image light having the first polarization, and substantially transmit the second image light having the second polarization.

In some embodiments, the controller is configured to control the active dimming device to switch between operating in a clear state to substantially transmit the input light and operating in a dark state to substantially block the input light. In some embodiments, the controller is configured to control the active dimming device to switch between operating in an intermediate state and operating in the clear state, or switch between operating in the intermediate state and operating in the clear state, and the active dimming device provides a maximum transmittance when operating in the clear state, a minimum transmittance when operating in the dark state, and an intermediate transmittance greater than the minimum transmittance and less than the maximum transmittance when operating in the intermediate state.

In some embodiments, the controller is configured to control the polarization switch to transmit the first image light as the second image light having the first polarization, and control the active dimming device to operate in the clear state, the intermediate state, or the dark state, and the reflective polarizer is configured to reflect the second image light having the first polarization as a third image light. In some embodiments, the controller is configured to control the polarization switch to transmit the first image light as the second image light having the second polarization, and control the active dimming device to operate in the clear state or the intermediate state.

In some embodiments, the device further includes a lens assembly at least partially overlapping with the reflective polarizer, wherein the reflective polarizer is disposed between the active dimming device and the lens assembly. In some embodiments, the lens assembly is configured to focus the third image light toward one or more exit pupils of an eye-box region of the device. In some embodiments, the lens assembly is configured with an adjustable optical power. In some embodiments, the active dimming device operating in the clear state or the intermediate state is configured to transmit a real world light toward the one or more exit pupils of the eye-box region of the device. In some embodiments, the active dimming device and the reflective polarizer at least partially overlap with one another.

In some embodiments, the display element includes a pico-projector. In some embodiments, the display element is disposed behind an ear of a user of the device. In some embodiments, the display element is disposed at a rear portion of a head of a user of the device. In some embodiments, the device further includes a light guide disposed between the polarization switch and the reflective polarizer, wherein the light guide is coupled with an in-coupling element and an out-coupling element to guide the second image light output from the polarization switch to the reflective polarizer. In some embodiments, the device further includes a frame extending from a first position adjacent an eye of the user of the device to a second position behind an ear of the user. The frame includes a front frame portion, a middle frame portion, and a rear frame portion, and the reflective polarizer is mounted to a front frame portion, the light guide is mounted to the middle frame portion, and the display element is mounted to the rear frame portion. In some embodiments, the active dimming device is mounted to the front frame portion of the frame, and the polarization switch is mounted to the rear frame portion of the frame.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in beam of the above disclosure.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a reflective polarizer configured to selectively reflect or transmit a polarized light based on a polarization of the polarized light;
a display element disposed at a first side of the reflective polarizer, and configured to output a first image light representing a virtual image;
a polarization switch disposed between the display element and the reflective polarizer, and configured to switch or maintain a polarization of the first image light; and
an active dimming device disposed at a second side of the reflective polarizer, and configured to provide an adjustable transmittance of an input light.

2. The device of claim 1, wherein the active dimming device is a global or local dimming device.

3. The device of claim 1, wherein the polarization switch is configured to transmit the first image light as a second image light that is incident onto the reflective polarizer as an off-axis incident light.

4. The device of claim 3, further comprising a controller configured to control the polarization switch to switch between outputting the second image light having a first polarization and outputting the second image light having a second polarization orthogonal to the first polarization.

5. The device of claim 4; wherein the reflective polarizer is configured to substantially reflect the second image light having the first polarization, and substantially transmit the second image light having the second polarization.

6. The device of claim 4, wherein the controller is configured to control the active dimming device to switch between operating in a clear state to substantially transmit the input light and operating in a dark state to substantially block the input light.

7. The device of claim 6, wherein
the controller is configured to control the active dimming device to switch between operating in an intermediate state and operating in the clear state, or switch between operating in the intermediate state and operating in the clear state, and
the active dimming device provides a maximum transmittance when operating in the clear state, a minimum transmittance when operating in the dark state, and an intermediate transmittance greater than the minimum transmittance and less than the maximum transmittance when operating in the intermediate state.

8. The device of claim 7, wherein
the controller is configured to control the polarization switch to transmit the first image light as the second image light having the first polarization, and control the active dimming device to operate in the clear state, the intermediate state, or the dark state, and
the reflective polarizer is configured to reflect the second image light having the first polarization as a third image light.

9. The device of claim 7, wherein the controller is configured to control the polarization switch to transmit the first image light as the second image light having the second polarization, and control the active dimming device to operate in the clear state or the intermediate state.

10. The device of claim 8, further comprising a lens assembly at least partially overlapping with the reflective polarizer, wherein the reflective polarizer is disposed between the active dimming device and the lens assembly.

11. The device of claim 10, wherein the lens assembly is configured to focus the third image light toward one or more exit pupils of an eye-box region of the device.

12. The device of claim 10, wherein the lens assembly is configured with an adjustable optical power.

13. The device of claim 11, wherein the active dimming device operating in the clear state or the intermediate state is configured to transmit a real world light toward the one or more exit pupils of the eye-box region of the device.

14. The device of claim 1, wherein the active dimming device and the reflective polarizer at least partially overlap with one another.

15. The device of claim 1, wherein the display element includes a pico-projector.

16. The device of claim 1, wherein the display element is disposed behind an ear of a user of the device.

17. The device of claim 1, wherein the display element is disposed at a rear portion of a head of a user of the device.

18. The device of claim 17, further comprising:
a light guide disposed between the polarization switch and the reflective polarizer,
wherein the light guide is coupled with an in-coupling element and an out-coupling element to guide the second image light output from the polarization switch to the reflective polarizer.

19. The device of claim 18, further comprising:
a frame extending from a first position adjacent an eye of the user of the device to a second position behind an ear of the user,
wherein the frame includes a front frame portion, a middle frame portion, and a rear frame portion, and
wherein the reflective polarizer is mounted to a front frame portion, the light guide is mounted to the middle frame portion, and the display element is mounted to the rear frame portion.

20. The device of claim 1, wherein the active dimming device is mounted to the front frame portion of the frame, and the polarization switch is mounted to the rear frame portion of the frame.

* * * * *